United States Patent
Sabbavarapu et al.

(10) Patent No.: US 10,147,416 B2
(45) Date of Patent: Dec. 4, 2018

(54) TEXT-TO-SPEECH PROCESSING SYSTEMS AND METHODS

(71) Applicant: Amazon Technologies, Inc., Seattle, WA (US)

(72) Inventors: Mahesh Babu Sabbavarapu, Seattle, WA (US); Ty Loren Carlson, Redmond, WA (US); Vijayabaskar Gangadaran, Issaquah, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 14/963,912

(22) Filed: Dec. 9, 2015

(65) Prior Publication Data
US 2017/0169811 A1    Jun. 15, 2017

(51) Int. Cl.
| | |
|---|---|
| G10L 13/08 | (2013.01) |
| G06F 15/02 | (2006.01) |
| G09B 5/06 | (2006.01) |
| G09B 21/00 | (2006.01) |
| G10L 13/04 | (2013.01) |
| G06F 3/16 | (2006.01) |
| G10L 15/22 | (2006.01) |

(52) U.S. Cl.
CPC .............. *G10L 13/08* (2013.01); *G06F 3/165* (2013.01); *G06F 15/0291* (2013.01); *G09B 5/06* (2013.01); *G09B 21/006* (2013.01); *G10L 13/04* (2013.01); *G10L 15/22* (2013.01)

(58) Field of Classification Search
CPC ....................................................... G10L 13/08
USPC ......................................................... 704/260
See application file for complete search history.

(56) References Cited

U.S. PATENT DOCUMENTS

| | | | | |
|---|---|---|---|---|
| 5,991,780 | A | * | 11/1999 | Rivette ............. G06F 17/30014 |
| | | | | 707/E17.008 |
| 2006/0047504 | A1 | | 3/2006 | Kodama |
| 2010/0225809 | A1 | * | 9/2010 | Connors ............. G06F 15/0283 |
| | | | | 348/500 |
| 2011/0043652 | A1 | * | 2/2011 | King .................... G06F 17/2211 |
| | | | | 348/222.1 |
| 2011/0026445 | A1 | | 10/2011 | Venkataramu et al. |

(Continued)

FOREIGN PATENT DOCUMENTS

| | | |
|---|---|---|
| WO | 01001373 A2 | 1/2001 |
| WO | 2001001373 A2 | 1/2001 |
| WO | 2004061794 A2 | 7/2004 |

OTHER PUBLICATIONS

International Search Report, dated Mar. 1, 2017, Applicant: Amazon Technologies, Inc., 17 pages.

(Continued)

*Primary Examiner* — Jakieda Jackson
(74) *Attorney, Agent, or Firm* — Pierce Atwood LLP

(57) ABSTRACT

A system and method for performing text-to-speech (TTS) processing of textual works, such a literary works. The system and method process text of these works and determine offsets corresponding to one or more of chapters, paragraphs, sentences, words, section of dialogs, sections of other context. Using these offsets, the system and method determine which portion and how much of a work to process using TTS processing at a time to produce a high quality audio output. This audio output may then be sent to a user device to allow the user device to play the audio output of the TTS processing.

28 Claims, 18 Drawing Sheets

(56) References Cited

U.S. PATENT DOCUMENTS

| | | | |
|---|---|---|---|
| 2011/0264452 A1 | 10/2011 | Venkataramu et al. | |
| 2012/0310649 A1* | 12/2012 | Cannistraro | G10L 13/00 |
| | | | 704/260 |
| 2014/0278429 A1* | 9/2014 | Ganong, III | G10L 15/26 |
| | | | 704/260 |
| 2015/0024796 A1 | 1/2015 | Wang et al. | |
| 2015/0242061 A1* | 8/2015 | Patel | G06F 3/017 |
| | | | 715/765 |
| 2016/0336003 A1* | 11/2016 | Agiomyrgiannakis | |
| | | | G10L 13/033 |

OTHER PUBLICATIONS

International Search Report and Written Opinion in PCT/US2016/065530, dated Jun. 21, 2018.

\* cited by examiner

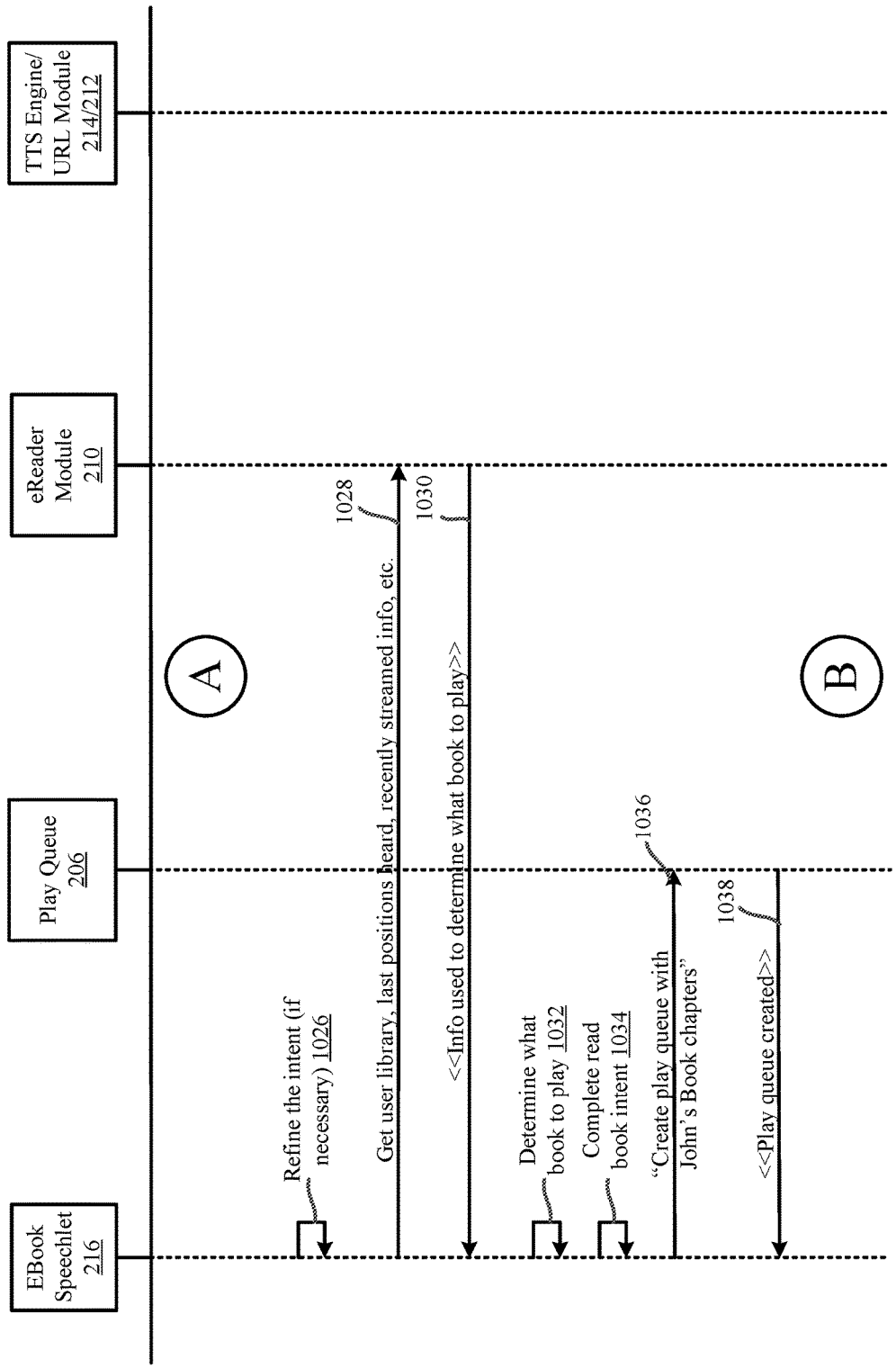

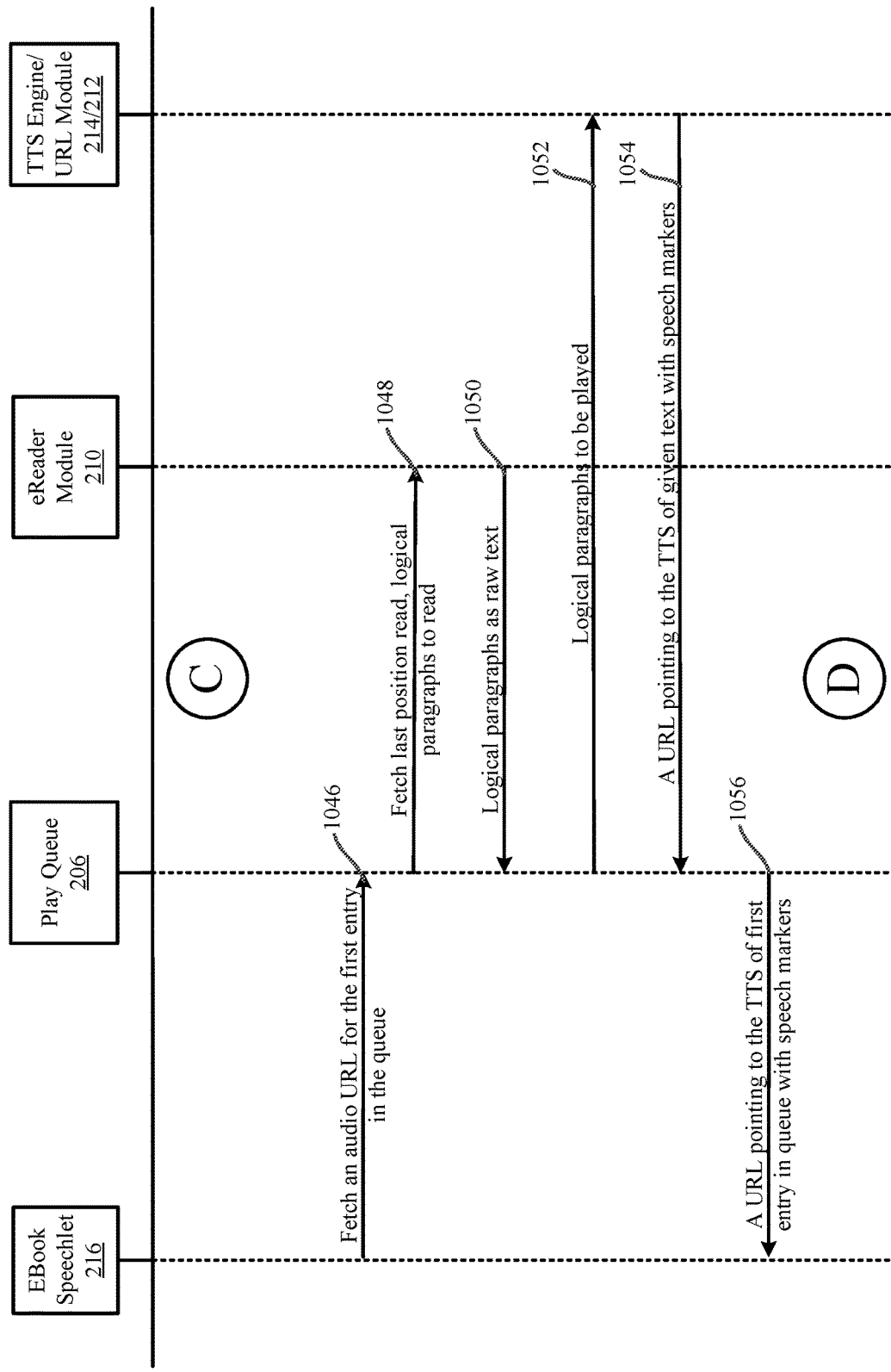

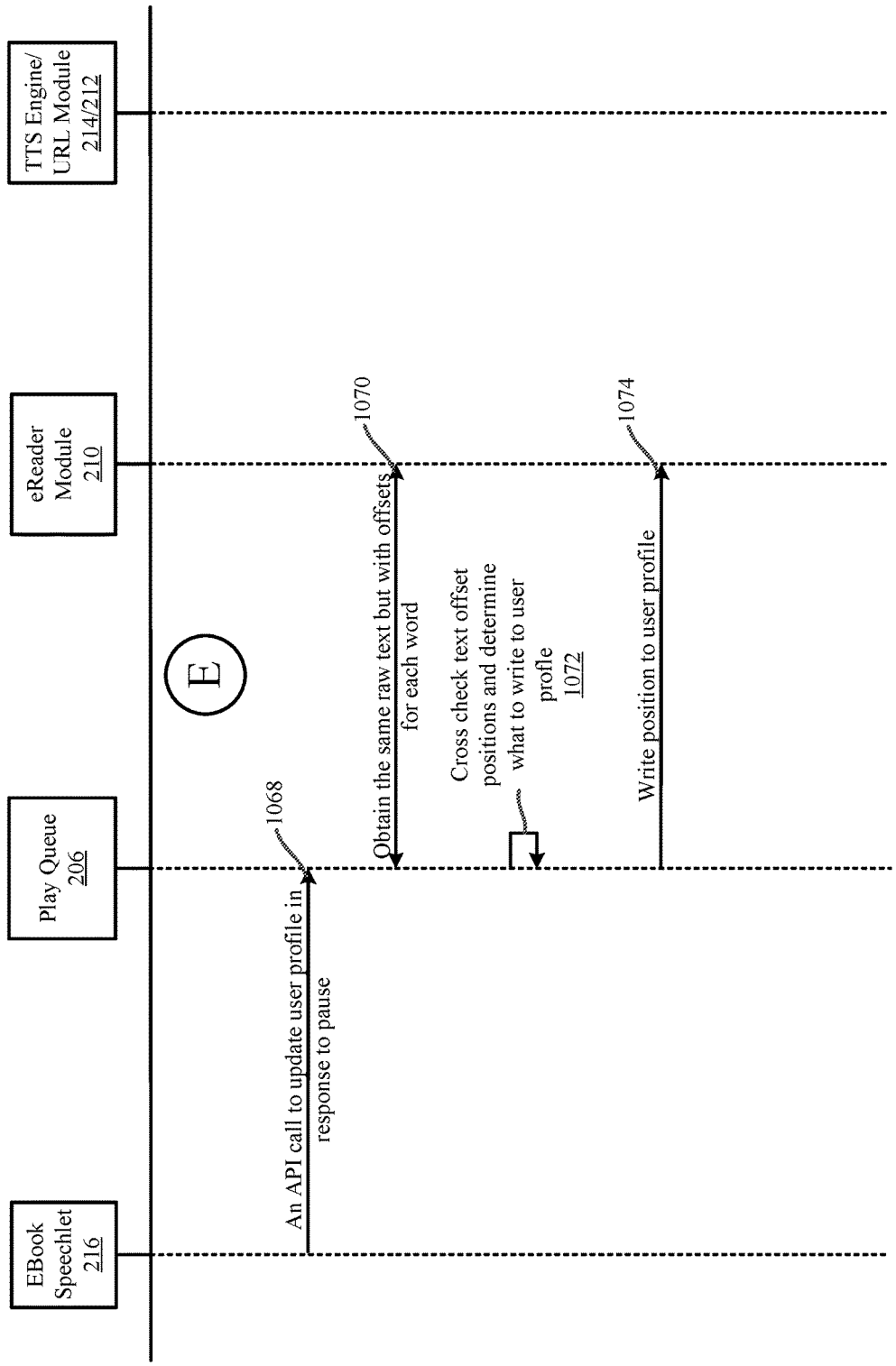

TEXT-TO-SPEECH PROCESSING SYSTEMS AND METHODS

BACKGROUND

Text-to-speech (TTS) systems convert written text to sound. This can be useful to assist people with a visual impairment, dyslexia and other reading impairments, by reading text of computer screens and other electronic devices out loud. Speech recognition systems have also progressed to the point where humans can interact with computing devices entirely relying on speech. TTS and speech recognition combined with natural language understanding processing techniques enable speech-based user control and output of a computing device to perform tasks based on the user's spoken commands. The combination of speech recognition and natural language understanding processing techniques is commonly referred to as speech processing. Such TTS and speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 10A-10F illustrate an overview of a sequence diagram of communications between components according to embodiments of the present disclosure.

DETAILED DESCRIPTION

Figure 1:
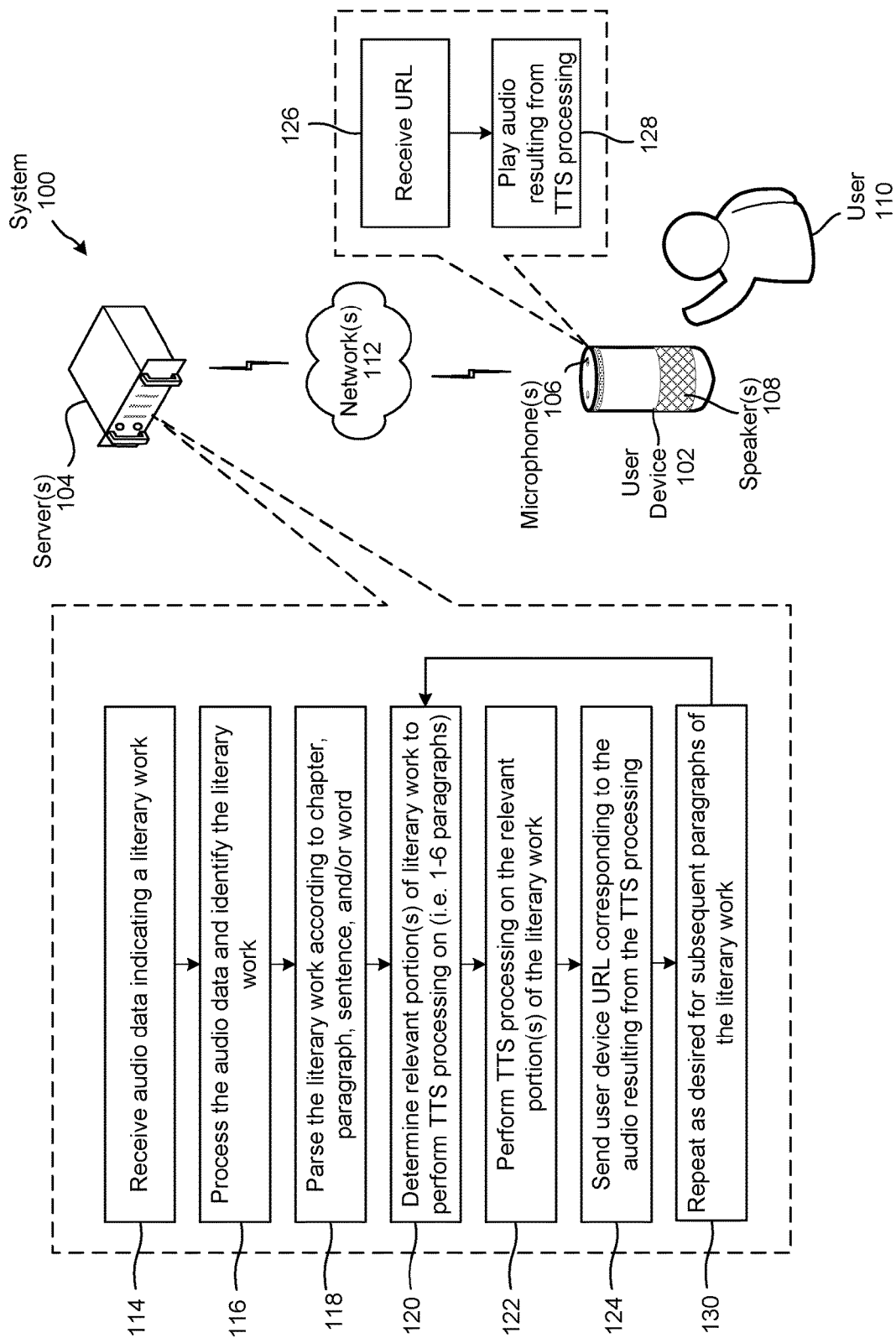
FIG. 1 illustrates an exemplary system overview according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

An increasing number of devices, including home appliances, are becoming capable of processing spoken commands using ASR processing. Further, an increasing number of devices are capable of providing output to users in the form of synthesized speech using TTS processing.

Books and other written media in audio form are commonly pre-recorded. That is, a human reader reads the specific text of the book aloud, and the spoken reading is recorded. That recording is then distributed to listeners via various media (such as electronic files, CDs, etc.). Such readings are sometimes referred to as "audiobooks" and may be accessed in various ways, including the software application Audible. While audiobooks can provide an easily accessible alternate way for users to experience books, there are certain drawbacks to the pre-recorded audiobook approach. One drawback is that an audiobook requires a human to read the entire book aloud. This process can be time consuming and expensive (particularly if a well-known actor is hired to read the book). Audiobooks are also limited in the number of voices available to read the book (just one, the reader) and the number of books available in the format, as only the more popular books are typically read aloud and recorded in this manner.

To supplement a catalog of audiobooks, and provide additional choices to users over what content can be spoken, a combination of configurability, audio detection, remote command execution, and ability to speak responses using TTS processing, may be used to configure a system to read large quantities of text (such as books) and perform other such activities for users. Such a system may be particularly useful for those with visual or reading impairments, as the system may allow a system to read aloud a variety of books (including electronic books that are not available as audio books or not formatted in an audio format) in a variety of voices that may otherwise be unavailable with traditional audiobooks.

One issue with performing TTS processing on large textual works, such as books, is how to parse the portions of the book in order to provide context so that the resulting audio is natural and pleasant to a user. TTS systems tend to sound more natural when larger sections of text are processed together. This is because a TTS system can craft more natural sounding audio when it has information about the text surrounding the text that is being spoken. For example, TTS output corresponding to a word may sound more natural if the TTS system has information about the entire sentence in which the word appears. Similarly, TTS output corresponding to a sentence may sound more natural if the TTS system has information about the entire paragraph in which the sentence appears. Other textual characteristics, such as indications of dialog, chapter breaks, etc., if known to a TTS system, may allow the TTS system to create more natural sounding output audio. Thus, it may be beneficial to for a system to take raw text from an electronic file that is unstructured (i.e., has limited data markings/offsets around the text) and identify such markings/offsets (for example, the chapters, paragraphs, etc.) as well as to identify certain characteristics about the text (e.g., a paragraph's nature and content, etc.). Then TTS processing can be performed on the parsed portions using the additional information to provide natural and pleasant audio data to a user device. However, it may also be undesirable to perform TTS processing on too large a portion of text. For example, if a user requests a 500 page book to be read aloud, it would consume unnecessary resources for the system to perform TTS processing on page 250 if the user is only currently listening to page 25. Thus, some processing is desired to chunk and parse the textual work for TTS processing purposes.

Offered are systems and methods for parsing literary works and other large textual works (such as magazines, periodicals, web based publications and articles, websites, etc.) according to chapters, paragraphs, sections of dialogue (such as multiple sequential lines of dialogue), and other contextual portions. This is because TTS processing depends on context. Meaning, the larger the portions of text and/or appropriate context TTS processing is performed on, the more natural the resulting audio/speech corresponding to the text. In this respect, when a user of a device desires to have a literary work (such as an electronic book) read out loud by the device, the systems and methods identify the literary work and where the user left off within the literary work. The systems and methods may also determine the literary work is a non-audio formatted electronic book. The systems and methods then parse the corresponding portions of the literary work according to chapters, paragraphs, sections of dialogue, and other contextual portions; and perform TTS processing on the parsed portions to provide an audio reading of the literary work to the device.

The parsing of the literary work may include determining a beginning of a paragraph as word number X, the total number of words in the paragraph, a last word of the paragraph as word number Y. Similarly, a beginning of a sentence, the total number of words in the sentence, an end of the sentence, and other information may be determined and used by the system. Using the chapter, paragraph, sentence, and word offsets, the systems and methods may also allow the user to fast forward or skip forward, or rewind or skip backwards by chapters, paragraphs, sentences, words, etc.

An exemplary system overview is described in reference to FIG. 1. As shown in FIG. 1, a system 100 may include a user device 102 and one or more servers 104. The user device 102 may include microphone(s) 106 and speaker(s) 108, and be operated by a user 110. The user device 102 and the server(s) 104 may be in communication with one another over a network 112. The system may be speech controlled. That is, audio data may be sent from the user device 102 to the server(s) 104 for analysis by the server(s) 104 to determine text corresponding to the audio (for example using ASR/NLU techniques as described in further detail below) and to process that text to determine and execute a command from the user (for example, a command to read a book aloud). The server(s) 104 may also synthesize speech from text (i.e., perform TTS processing of text, such as text corresponding to the book) and send audio data corresponding to the text to the user device 102.

As illustrated, the server(s) 104 may receive audio data of a spoken command from the user device 102, illustrated as block 114. The spoke command may include a title of a literary work the user desires to have read to the user by the user device 102. The server(s) 104 may process the audio data and identify the literary work, for example using ASR and/or NLU processing, illustrated as block 116. Once the server(s) 104 identifies the literary work, the server(s) 104 may receive data corresponding to the literary work (such as its text) and parse the literary work according to chapter, paragraph, sentence, word, and/or other structure, as illustrated as block 118. This parsing may include inserting offsets identifying a beginning and end of a chapter, the number of paragraphs, the number of words, etc. within the chapter. The parsing, may also include inserting offsets identifying a beginning and end of a paragraph, the number of sentences, the number of words, etc. within the paragraph. The parsing may also include inserting offsets identifying a beginning and end of a sentence, the number of and the number of words, etc. within the sentence. For example, the offsets may correspond to: chapter 1 begins at word 1, chapter 1 ends at word 1,000, paragraph 1 begins at word 1, paragraph 1 ends at word 15, etc.

It should be appreciated that the parsing and insertion of offsets may only need to be performed once for each literary work. Thus, if the literary work identified has already been parsed, the parsed literary work including the offsets may be stored on the server(s) 104 and block 118 may be unnecessary.

The server(s) 104 may determine the relevant portions of the literary work to perform TTS processing on, illustrated as block 120. The parsing and identification of offsets can be used to determine how much of the text of the work to process at a given time to result in high-quality audio output with the advent flow of the speaking voice while at the same time minimizing the use of unnecessary resources and allowing for general system performance. In one example, the server(s) 104 may determine to perform TTS processing on 1-6 paragraphs at a time, and process subsequent paragraphs (such as 2 additional paragraphs at a time) as needed. This may be appropriate because a TTS system can typically create TTS output audio data from input textual data faster than a playback device (such as user device 102) can actually play back the TTS output audio data. In other words, TTS processing is typically faster than TTS playback. Thus, a TTS system may wish to only perform TTS processing on textual portions as the time approaches for playback of audio corresponding to those textual portions.

The server(s) 104 may perform TTS processing on the relevant portions of the text of the literary work, illustrated as block 122. The server(s) 104 may then store the audio output from the TTS system so that it may be retrieved by the user device 102. To that end, the server(s) 104 may stream the audio output to the user device 102 via a URL in real-time or the server(s) 104 may provide a downloadable audio file (such as an MPEG) the user device 102 may download and play. In an example, the server(s) 104 may send a link, such as a URL, corresponding to the audio output of the TTS processing to the user device 102, illustrated as block 124. The link or URL may point to a location where the audio output is stored. The user device 102 receives the URL, illustrated as block 126, and plays the audio output corresponding to the relevant portions of the text of the literary work via speaker(s) 108, illustrated as block 128. It should be appreciated that the audio output may be played in substantially real-time and a first portion (such as a first sentence) of the relevant portion of the text of the literary work may be played while a second portion (such as a first sentence) of the relevant portion of the text of the literary work is being processed via TTS processing.

As the user 110 continues to cause the user device 102 to continue to play the audio output of the TTS processing, the server(s) 104 may repeat the steps identified as block 120-124 above for subsequent sections of text, such as paragraphs, illustrated as block 130. For example, the subsequent sections of text may be processed via TTS processing prior to the prior section of text being played back. The server(s) 104 continue the process to provide the user with a seamless audio output experience (i.e., the reading of one paragraph after another) until the user desires to stop the audio output, for example, by pausing or stopping the audio output via the user device 102.

The systems and methods disclosed herein allow for large textual works, such as literary works, to be read via an audio output to a user (such as a visually impaired user), for example when the literary work has no corresponding pre-recorded audio version. This opens up the number of books, magazines, periodicals, web based publications and articles, websites, etc. a user can have delivered using audio output instead of textual output.

Figure 2:
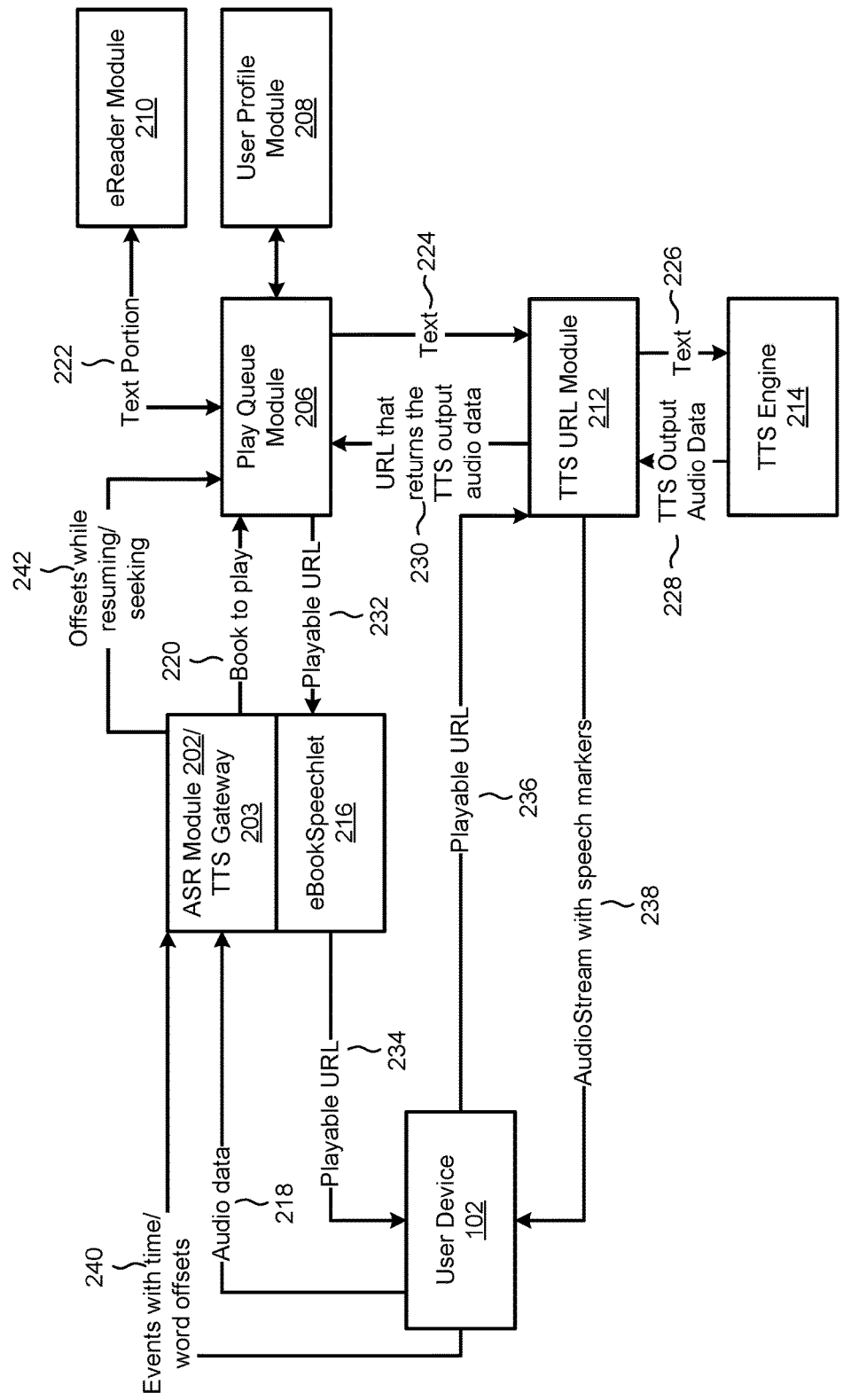
FIG. 2 illustrates a conceptual diagram of various components of a system for receiving an indication of a literary work to process using TTS processing and generate an audio output, according to embodiments of the present disclosure.

The system 100 of FIG. 1 may operate using various components as described in FIG. 2. FIG. 2 is a conceptual diagram of various components of a system for receiving an indication of a literary work to process using TTS processing and generate an audio output, according to embodiments of the present disclosure. The various components illustrated may be located on a same or different physical devices. Communication between various components illustrated in FIG. 2 may occur directly or across the network 112. As illustrated, the component may include the user device 102, an ASR Module 202/TTS Gateway 203, a TTS Enabled determination 204, a Play Queue Module 206, a User Profile Module 208, an eReader Module 210, a TTS URL Module 212, a TTS Engine 214, and an eBook Speechlet 216.

An audio capture component, such as a microphone(s) of user device 102, captures audio corresponding to a spoken utterance relating to a command, such as "play" a title of a literary work. The user device 102 may convert the input audio into audio data and send the audio data to the ASR module 202/TTS gateway 203 (which may be part of the server(s) 104), illustrated as arrow 218. The audio data may be processed by user device 102 prior to further downstream processing. For example, the user device 102 may transform the audio data from the microphone into data for processing by downstream components, such as the ASR module 202. In one example, the user device 102 (using a component such as an acoustic front end) may reduce noise in the audio data and divide the digitized audio data into frames representing a time intervals for which a number of values, called features, representing the qualities of the audio data, along with a set of those values, called a feature vector, representing the features/qualities of the audio data within the frame are generated. Many different features may be determined, as known in the art, and each feature represents some quality of the audio that may be useful for audio processing, such as ASR processing. A number of approaches may be used by the user device 102 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. Unless specifically stated otherwise, the audio data discussed below may be either pre- or post-processed by the user device 102.

The ASR module 202 receives the audio data and converts the audio data into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models stored in an ASR model knowledge base. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR module 202 outputs the most likely text recognized in the audio data. The ASR process may also output multiple hypotheses in the form of a lattice or an N-best list with each hypothesis corresponding to a confidence score or other score (such as probability scores, etc.).

Following ASR processing, the ASR results may be sent to other processing components, which may be local to the device performing ASR and/or distributed across the network(s) 112. For example, ASR results in the form of a single textual representation of the speech, an N-best list including multiple hypotheses and respective scores, lattice, etc. may be sent to a server, such as server(s) 104, for natural language understanding (NLU) processing, such as conversion of the text into commands for execution by the server(s) 104, or by another device (such as a server running a search engine, etc.)

The device performing NLU processing (e.g., server(s) 104) may include various components, including potentially dedicated processor(s), memory, storage, etc. A device configured for NLU processing may include a named entity recognition (NER) module and intent classification (IC) module, a result ranking and distribution module, and knowledge base. The NLU process may also utilize gazetteer information in NLU processing. The gazetteer information may be used for entity resolution, for example matching ASR results with different entities (such as book titles, contact names, etc.) Gazetteers may be linked to users (for example a particular gazetteer may be associated with a specific user's book collection), may be linked to certain domains (such as shopping), or may be organized in a variety of other ways.

The NLU process takes textual input (such as processed from ASR module 202) and attempts to make a semantic interpretation of the text. That is, the NLU process determines the meaning or intent behind the text based on the individual words and then implements that meaning. The NLU module interprets a text string to derive an intent or a desired action from the user as well as the pertinent pieces of information in the text that allow a device (e.g., device 102) to complete that action. For example, if a spoken utterance is processed using ASR and outputs the text "play" a title of a literary work the NLU process may determine that the user intended to activate a TTS function to initiate an audio output reading the literary work.

The NLU may process several textual inputs related to the same utterance. For example, if the ASR outputs N text segments (as part of an N-best list), the NLU may process all N outputs to obtain NLU results, as known in the art. The output from the NLU processing (which may include tagged text, commands, etc.) may then be sent to a command processor, such as a play queue module 206, which may be located on a same or separate server(s) 104 as part of system 100.

For example, the NLU results may correspond to "play" an audio output of a specific literary work or book. In this respect, the TTS gateway 203 may determine whether TTS is enabled for the particular literary work. When TTS is enabled, the TTS gateway 203 sends the NLU results to the play queue module 206, illustrated as book to play arrow 220.

The play queue module 206 communicates with the user profile module 208 to determine whether user has begun the literary work, and if so where the user left off within the literary work. The user profile module 208 may store prior usage history and bookmarks corresponding to literary works the user has begun consuming and where the user left off within the literary works. This is useful, for example, if a user uses one device (such as an eReader) to read a first portion of a book, but then at a later time speaks a command to the user device 102 to continue playing the book. The system may store an indicator of the user's location in the book after the user finishes with the eReader. The system may then begin TTS processing of the book at the user's location using the indicator. Once the determination of which portion of the literary work the user left off at, the play queue module 206 communicates with the eReader module 210 to obtain the portions of text of the literary work corresponding to the portions that are to be processed, illustrated as arrow 222. These text portions may correspond to a chunk of text comprising the next few (e.g., 2-4) paragraphs of the literary work starting from where the user left off. These chunks of text may be associated with offsets or other metadata/information as described herein to allow for high quality TTS to be performed based on chapter, paragraph, context etc.

The play queue module 206 then communicates the text, illustrated as arrow 224 (which may be same as text from arrow 222 or may include additional offsets and indications within the text), to the TTS URL module 212, which communicates the text, illustrated as arrow 226 (which may be the same as text from arrow 224 or may be preprocessed by the TTS URL module 212), to the TTS Engine 214. The TTS Engine 214 performs text-to-speech processing. For example, the TTS Engine 214 may be configured to synthesize speech based on text configured to be spoken.

The TTS Engine 214 transforms input text data (for example the text from arrow 226) into audio data representing speech. The TTS Engine 214 may include a TTS storage for converting the input text into speech. The TTS Engine 214 may include its own controller(s)/processor(s) and memory or may use the controller/processor and memory of the server(s) 104 or other device, for example. Similarly, the instructions for operating the TTS Engine 214 may be located within the TTS Engine 214, within the memory and/or storage of the server(s) 104 or within an external device.

Text input into a TTS Engine 214 may be processed to perform text normalization, linguistic analysis, and linguistic prosody generation. During text normalization, the TTS Engine 214 processes the text input and generates standard text, converting such things as numbers, abbreviations (such as Apt., St., etc.), symbols ($, %, etc.) into the equivalent of written out words.

During linguistic analysis the TTS Engine 214 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. The TTS Engine 214 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage. The linguistic analysis performed by the TTS Engine 214 may also identify different grammatical components such as prefixes, suffixes, phrases, punctuation, syntactic boundaries, or the like. Such grammatical components may be used by the TTS Engine 214 to craft a natural sounding audio waveform output. The language dictionary may also include letter-to-sound rules and other tools that may be used to pronounce previously unidentified words or letter combinations that may be encountered by the TTS Engine 214. Generally, the more information included in the language dictionary, the higher quality the speech output.

Based on the linguistic analysis, the TTS Engine 214 may then perform linguistic prosody generation where the phonetic units are annotated with desired prosodic characteristics, also called acoustic features, which indicate how the desired phonetic units are to be pronounced in the eventual output speech. During this stage the TTS Engine 214 may consider and incorporate any prosodic annotations that accompanied the text input. Such acoustic features may include pitch, energy, duration, and the like. Application of acoustic features may be based on prosodic models available to the TTS Engine 214. Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS Engine 214, the TTS Engine 214 may assign more robust and complex prosodic characteristics that vary across the portion, thus making the portion sound more human/resulting in higher quality audio output.

The TTS Engine 214 may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS Engine 214 may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS Engine 214 may perform speech synthesis using one or more different methods. In one method of synthesis called unit selection, described further below, the TTS Engine 214 matches the symbolic linguistic representation against a database of recorded speech, such as a database of a voice corpus. The TTS Engine 214 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS Engine 214 may match units (for example in a unit database) to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, noise, are varied by the TTS Engine 214 to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS Engine 214 may include an acoustic model, or other models, which may convert a symbolic linguistic representation into a synthetic acoustic waveform of the text input based on audio signal manipulation. The acoustic model includes rules may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

A number of techniques may be used to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The TTS Engine 214 may be configured to perform TTS processing in multiple languages. For each language, the TTS Engine 214 may include specially configured data, instructions and/or components to synthesize speech in the desired language(s). To improve performance, the TTS Engine 214 may revise/update the contents of the TTS storage based on feedback of the results of TTS processing, thus enabling the TTS Engine 214 to improve TTS processing.

Other information may also be stored in the TTS storage for use in TTS processing. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a happy voice to correspond to a happy moment in the literary work), or other customizable characteristic. The TTS Engine 214 may include specialized databases or models to account for user preferences.

For example, to create the customized speech output of the system, the system may be configured with multiple voice corpuses/unit databases, where each unit database is configured with a different "voice" to match desired speech qualities. The voice selected by the TTS Engine 214 to synthesize the speech may correspond to a character in the literary work. For example, one voice corpus may be stored to be used to synthesize a 1st male character's speech, another may be stored to be used to synthesize a 1st female's character, and so on. Thus the audio of each customized voice corpus matches the respective desired speech quality. The customized voice corpuses may then be used during runtime to differentiate different characters in the literary work. Additionally, parametric synthesis may be used to synthesize speech with the desired speech quality. For parametric synthesis, parametric features may be configured that match the desired speech quality. The application may also offer a user certain pre-programmed choices of types of sounds that the system may provide.

As the TTS Engine 214 produces the speech audio output corresponding to the text 226, the TTS Engine 214 sends the TTS output audio data to the TTS URL Module 212, illustrated as arrow 228. The TTS URL Module 212 provides a URL to the TTS output audio data to the Play Queue Module 206, illustrated as arrow 230. The Play Queue Module 206 forwards the URL to the eBook Speechlet 216, illustrated as arrow 232, which sends the URL to the user device 102, illustrated as arrow 234. The user device 102 accesses the URL, illustrated as arrow 236, receives the audio output from the TTS URL Module 212, illustrated as arrow 238, and outputs the audio output data via the speaker(s) of the user device to the user.

In the event the user pauses or stops the playing of the audio output (for example, through a "stop" or "pause" spoken command), the user device may send an indication of the time location of the pause within the audio output and/or offset(s) corresponding to the word(s) of the text where the pause occurred to the TTS gateway 203, illustrated as arrow 240. In another aspect, the playing of the audio output may be paused or stopped based on a timer (such as a sleep timer). The TTS gateway 203 sends the offset(s) to the Play Queue Module 206, illustrated as arrow 242. The Play Queue Module 206 may then communicate with the eReader Module to determine the raw text including the offset(s), and store the position within the literary work where the user paused or stopped within the User Profile Module 208. This position may then be used to resume the literary work (either in audio form or in visual form if accessed later, for example, on an eReader). In one aspect, the position that is stored may relate to a paragraph offset (i.e., beginning of a paragraph), even if the user paused or stopped within the paragraph. This is because the pause or stop time of the audio output may not correlate specifically with a word offset, but since only 1-6 paragraph were sent for TTS processing, the paragraph offset can be determined. Thus, when the literary work is to be resumed, the entire paragraph within which the user paused or stopped may be sent for TTS processing to provide the correct context for the paragraph and allow for a more natural TTS result. The indication of where a user left off in the literary work may be stored regardless of how a user consumed the literary work. That is, if a user was consuming the work via reading the text of the work using a traditional tablet, eReader, etc. the reader's last viewed location (or a corresponding paragraph/page/section break) may be stored with the indication. If the user was consuming the work via having audio corresponding to the work played back, the location where the playback paused (or a corresponding paragraph/page/section break) may be stored with the indication as described above.

To more accurately identify the place where the audio output was paused or stopped, the TTS URL Module 212 may insert speech markers into the audio data and send the speech markers to the user device 102, illustrated as arrow 238. For example, the audio output may include 100 words and playback of the first word starts at 1 second in the audio, playback of the second word starts at 3 seconds, playback of the third word starts at 5 seconds, playback of the fourth word starts at 8 seconds, playback of the fifth word starts at 12 seconds, and so on. This may allow for identification of the word offset at the point the audio output is paused or stopped. In this case, when the literary work is to be resumed, the entire paragraph within which the user paused or stopped may be sent for TTS processing to provide the correct context for the paragraph and allow for a more natural TTS result. However, the audio output may resume at the specific word where the audio output was previously paused or stopped.

Similar techniques can be used to provide skip back or rewind, and skip forward or fast forward functionality to the user. The amount of text to skip back or skip forward may be determined based on paragraph offsets, sentence offsets, word offsets, etc., as described in further detail below.

Figure 3:
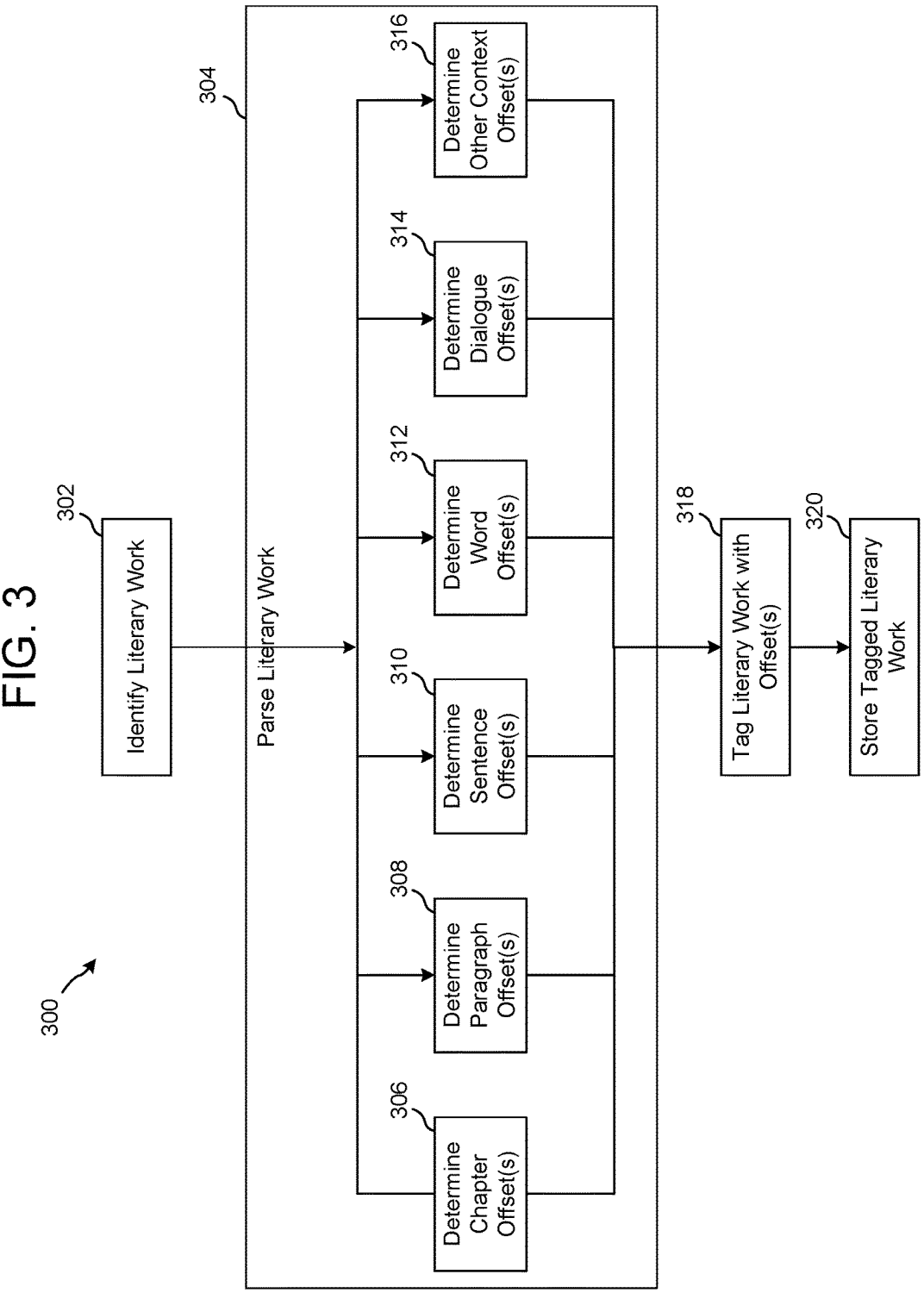
FIG. 3 illustrates a flow diagram illustrating parsing of a literary work according to embodiments of the present disclosure.

FIG. 3 is a flow diagram 300 illustrating parsing of a literary work according to embodiments of the present disclosure. As shown, the system may identify a textual work, illustrated as block 302. This may be any type of textual work, including literary works, books, articles, etc. For illustrative purposes, a literary work is used as an example. The system then parses the literary work to determine offsets, illustrated as block 304.

The system may determine chapter offsets, illustrated as block 306. The chapter offsets may correspond to a count of words that the chapter begins with and ends with. For example, chapter 1 begins at word 1 and chapter 1 ends at word 1,000, chapter 2 begins at word 1,001 and chapter 2 ends at word 2,500, etc.

The system may determine paragraph offsets, illustrated as block 308. The paragraph offsets may correspond to a count of words that the paragraph begins with and ends with. For example, paragraph 1 begins at word 1 and paragraph 1 ends at word 50; paragraph 2 begins at word 51 and paragraph 2 ends at word 150, etc.

The system may determine sentence offsets, illustrated as block 310. The sentence offsets may correspond to a count of words that the sentence begins with and ends with. For example, sentence 1 begins at word 1 and sentence 1 ends at word 10; sentence 2 begins at word 11 and sentence 2 ends at word 25, etc.

The system may determine word offsets, illustrated as block 312. The word offsets may correspond to a count of the words, with each word increasing by one in consecutive order. For example, word 1, word 2, . . . word 1,000, etc. of the literary work.

The system may determine dialogue offsets, illustrated as block 314. The dialogue offsets may correspond to a count of words that the section of dialogue begins with and ends with. For example, dialogue section 1 begins at word 3,000 and dialogue section 1 ends at word 3,050; dialogue section 2 begins at word 4,025 and dialogue section 2 ends at word 4,075, etc. The separate dialogue sections may be useful to group together and TTS processing performed on the whole dialogue section to provide context, as a single dialogue section may include multiple short paragraphs that if TTS processing was performed on separately may result in undesirable audio output.

The system may also determine other context type offsets, illustrated as block 316. These contexts may also correspond to a count of words that the section of context begins with and ends with as described above. Context can be thought of as relevant constraints of the communicative situation that influence language use and language variation, such as a certain character's point of view of a situation for example. As an example, a written work may contain certain text that is set apart from other text, such as an aside (which may be indicated by italicized or offset text), a note to a reader (which may be included in brackets or parenthesis), a table of contents, an appendix, a prologue, and introduction, etc.

Such contexts may alter a desired audio reading of the text, and thus indications of the context may be used by the downstream TTS process. By identifying different contexts and situations within the literary work using offsets, the system can group together context sections, which may include multiple paragraphs, and perform TTS processing on entire context sections to provide higher quality audio output results. The system may also choose to forego performing TTS processing on certain context sections, such as a table of contents, etc., as such sections may be immaterial or irrelevant to the user.

The system may tag the literary work with one or more of the types of offsets described above, illustrated as block 318, and store the tagged literary work in a database, illustrated as block 320. The tagged literary work may include the text corresponding to the words of the work as well as textual indicators (i.e., tags) that are not read aloud but are used by a downstream process (for example, the TTS engine 214) to indicate chapters, paragraphs, sentences, etc. It should be appreciated that a number of literary works and other textual works may be available, and the system may only have to parse, tag, and store each one once. This allows the system to access the already parsed and tagged works as needed in response to a request in order to have groups of the text processed using the TTS processing techniques described above.

Figure 4:
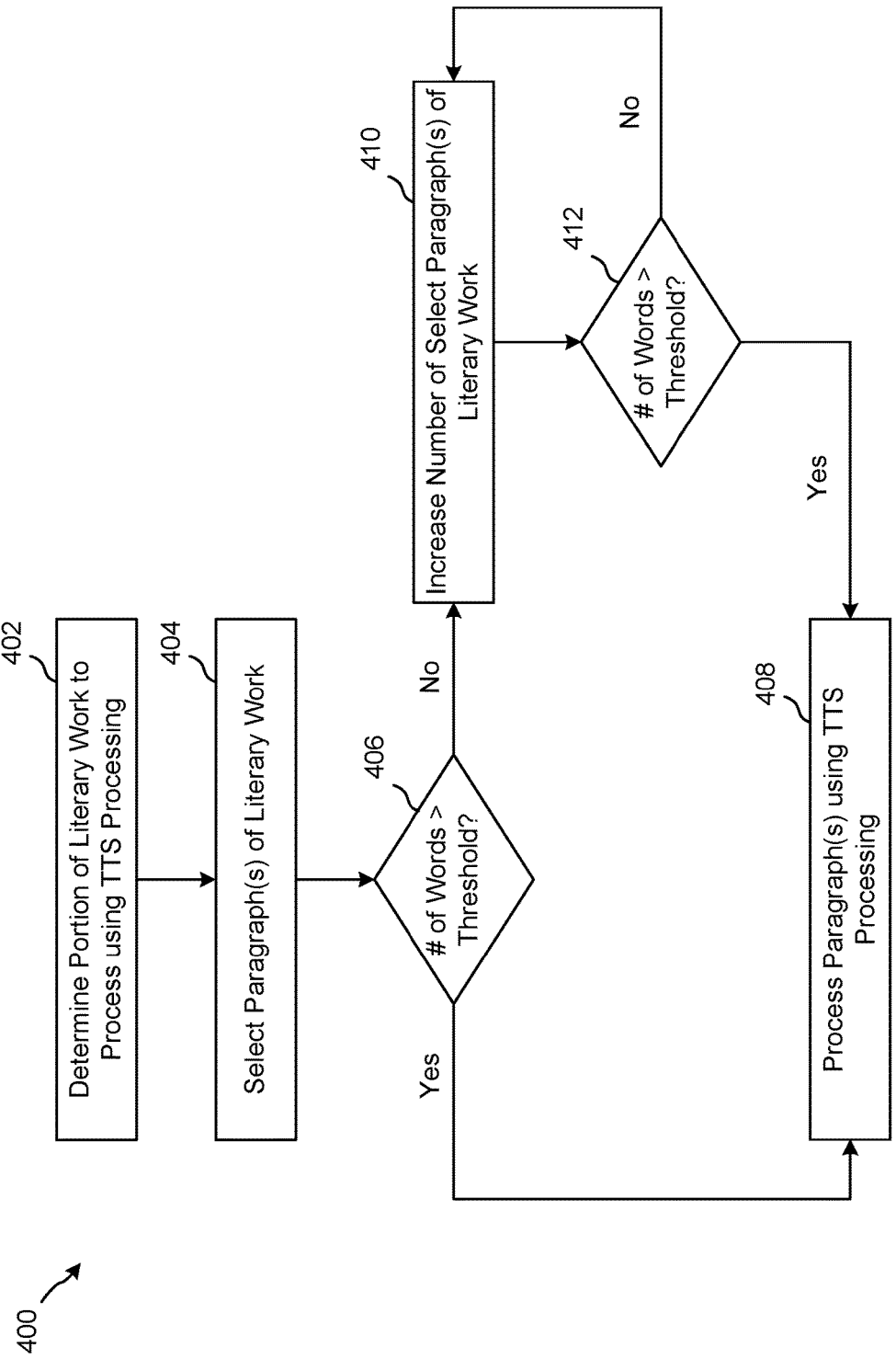
FIG. 4 illustrates a flow diagram illustrating determining which portions of the literary work to process using TTS processing based on paragraphs and an amount of words according to embodiments of the present disclosure.
Figure 5:
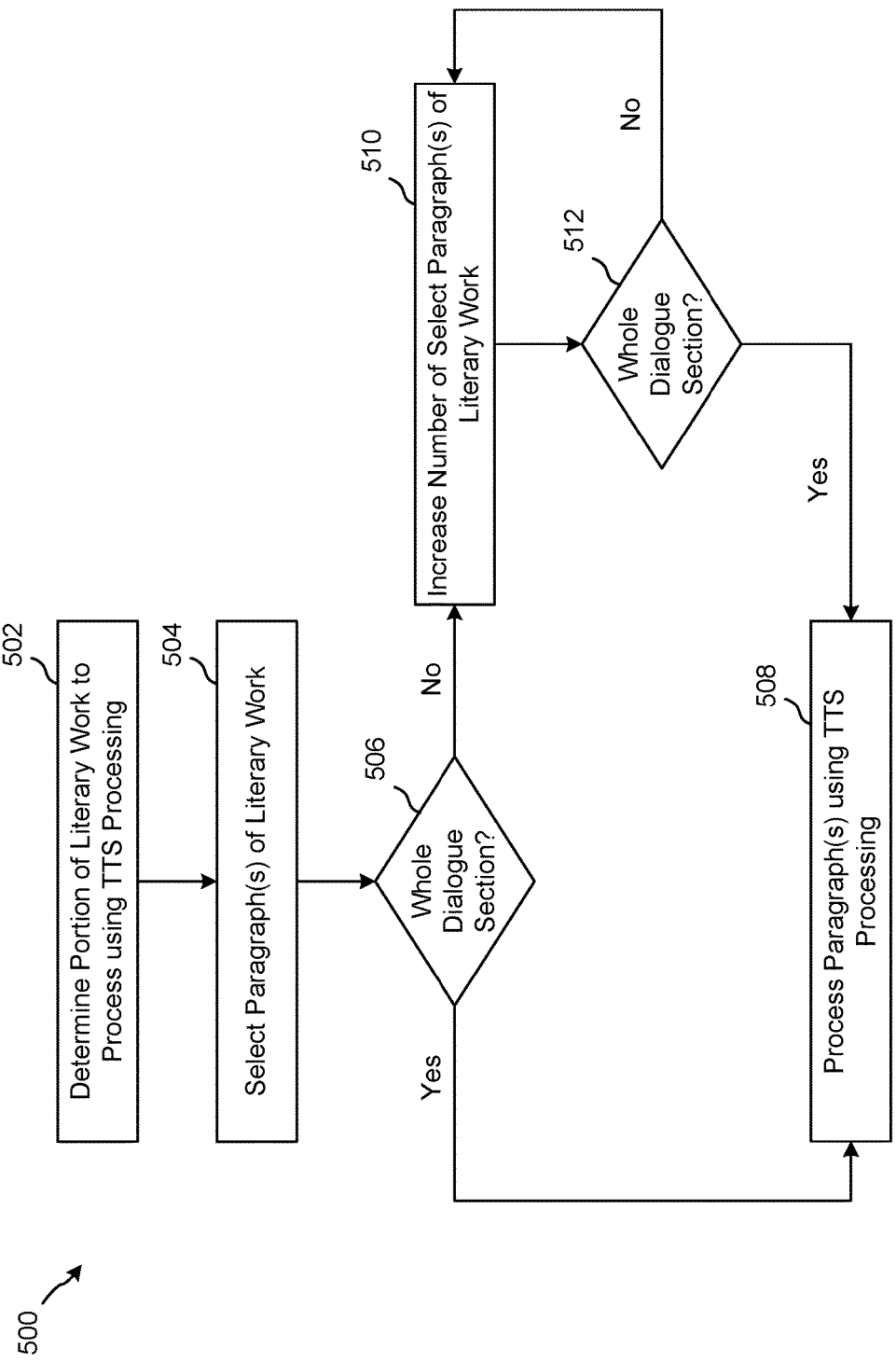
FIG. 5 illustrates a flow diagram illustrating determining which portions of the literary work to process using TTS processing based on dialogue section according to embodiments of the present disclosure.
Figure 6:
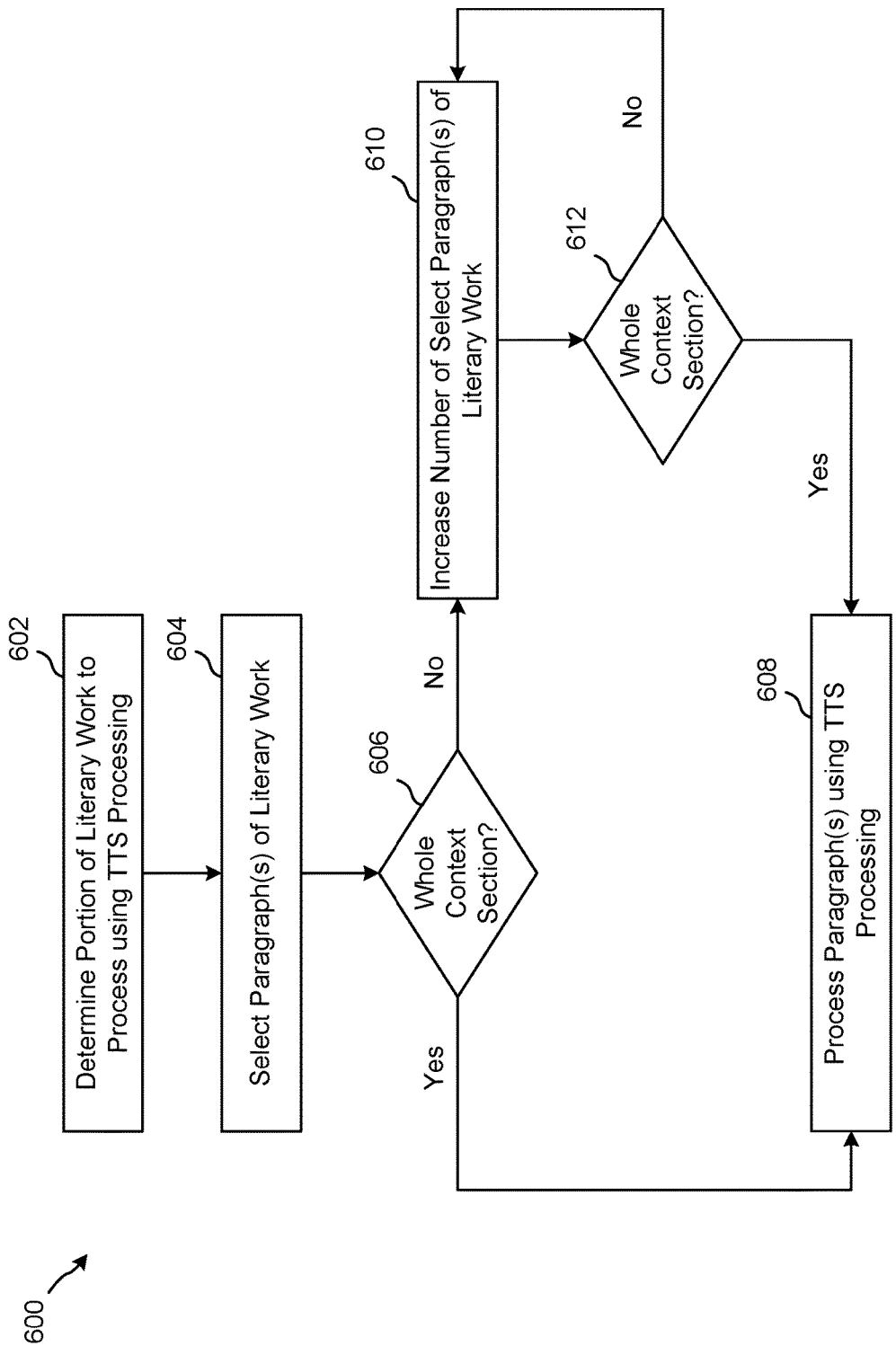
FIG. 6 illustrates a flow diagram illustrating determining which portions of the literary work to process using TTS processing based on context section according to embodiments of the present disclosure.

FIGS. 4-6 are flow diagrams illustrating determining which contextual portions of the literary work to process using TTS processing according to embodiments of the present disclosure. In general, TTS processing produces higher quality, more natural audio output with increasing amounts of content. To provide high quality, natural audio output, the amount of text selected for TTS processing is selected by the system according to varying degrees of constraints to ensure the text being processed via TTS processing includes a sufficient amount of context.

FIG. 4 is a flow diagram 400 illustrating determining which portions of the literary work to process using TTS processing based on paragraphs and an amount of words according to embodiments of the present disclosure. As shown, the system may determine a portion of the literary work to process using TTS processing, illustrated as block 402. This determination may include the system selecting one or more paragraphs of the literary work, illustrated as block 404. It should be appreciated that the selected paragraphs may correspond to a position in the literary work where the user last left off based on information in the user's profile. The system may then determine whether the number of words contained within the selected paragraph(s) is greater than a threshold number, illustrated as block 406. This threshold may be set as a specific number (such as 100 words, or more or less than 100 words), or may be dynamic based on quality of the results of TTS processing. For example, the system may be trained to select the number of words based on past selections and the resulting quality of the TTS processing.

When the number of words contained within the selected paragraph(s) is greater than the threshold, the system may proceed to process the selected paragraph(s) using TTS processing to product an audio output, illustrated as block 408. When the number of words contained within the selected paragraph(s) is less than the threshold, the system may increase the number of paragraph(s) selected, illustrated as block 410. This may include increasing the paragraph(s) selected by selecting another one or more paragraphs following the previously selected paragraph(s), selecting another one or more paragraphs preceding the previously selected paragraph(s), or both.

The system may then determine whether the number of words contained within the paragraph(s) is greater than the threshold number, illustrated as block 412. When the number of words contained within the paragraph(s) is greater than the threshold, the system may proceed to process the selected paragraph(s) using TTS processing to product an audio output, illustrated as block 408. When the number of words contained within the selected paragraph(s) is less than the threshold, the system may proceed back to block 410.

FIG. 5 is a flow diagram 500 illustrating determining which portions of the literary work to process using TTS processing based on dialogue section according to embodiments of the present disclosure. As shown, the system may determine a portion of the literary work to process using TTS processing, illustrated as block 502 similar to block 402 above. This determination may include the system selecting one or more paragraphs of the literary work, illustrated as block 504 similar to block 404 above. The system may then determine whether the selected paragraph(s) correspond to an entire dialogue section or only a portion of a dialogue section, illustrated as block 506. This ensures that portions of a dialogue are not left out, which could impact the context of the dialogue.

When the selected paragraph(s) correspond to an entire dialogue section, the system may proceed to process the selected paragraph(s) using TTS processing to product an audio output, illustrated as block 508. When the selected paragraph(s) correspond to only a portion of a dialogue section, the system may increase the number of paragraph(s) selected, illustrated as block 510. This may include increasing the paragraph(s) selected by selecting another one or more paragraphs following the previously selected paragraph(s), selecting another one or more paragraphs preceding the previously selected paragraph(s), or both.

The system may then determine whether the selected paragraph(s) correspond to the entire dialogue section or only a portion of the dialogue section, illustrated as block 512. When the paragraph(s) correspond to the entire dialogue section, the system may proceed to process the selected paragraph(s) using TTS processing to product an audio output, illustrated as block 508. When the paragraph(s) correspond to only a portion of a dialogue section, the system may proceed back to block 510.

FIG. 6 is a flow diagram 600 illustrating determining which portions of the literary work to process using TTS processing based on context section according to embodiments of the present disclosure. As shown, the system may determine a portion of the literary work to process using TTS processing, illustrated as block 602 similar to block 402 above. This determination may include the system selecting one or more paragraphs of the literary work, illustrated as block 604 similar to block 404 above. The system may then determine whether the selected paragraph(s) correspond to an entire context section or only a portion of a context section, illustrated as block 606. This ensures that portions of a context section are not left out, which could impact the TTS processing.

When the selected paragraph(s) correspond to an entire context section, the system may proceed to process the selected paragraph(s) using TTS processing to product an audio output, illustrated as block 608. When the selected paragraph(s) correspond to only a portion of a context section, the system may increase the number of paragraph(s) selected, illustrated as block 610. This may include increasing the paragraph(s) selected by selecting another one or more paragraphs following the previously selected paragraph(s), selecting another one or more paragraphs preceding the previously selected paragraph(s), or both.

The system may then determine whether the selected paragraph(s) correspond to the entire context section or only a portion of the context section, illustrated as block 612. When the paragraph(s) correspond to the entire context section, the system may proceed to process the selected paragraph(s) using TTS processing to produce an audio output, illustrated as block 608. When the paragraph(s) correspond to only a portion of a context section, the system may proceed back to block 610.

Figure 7:
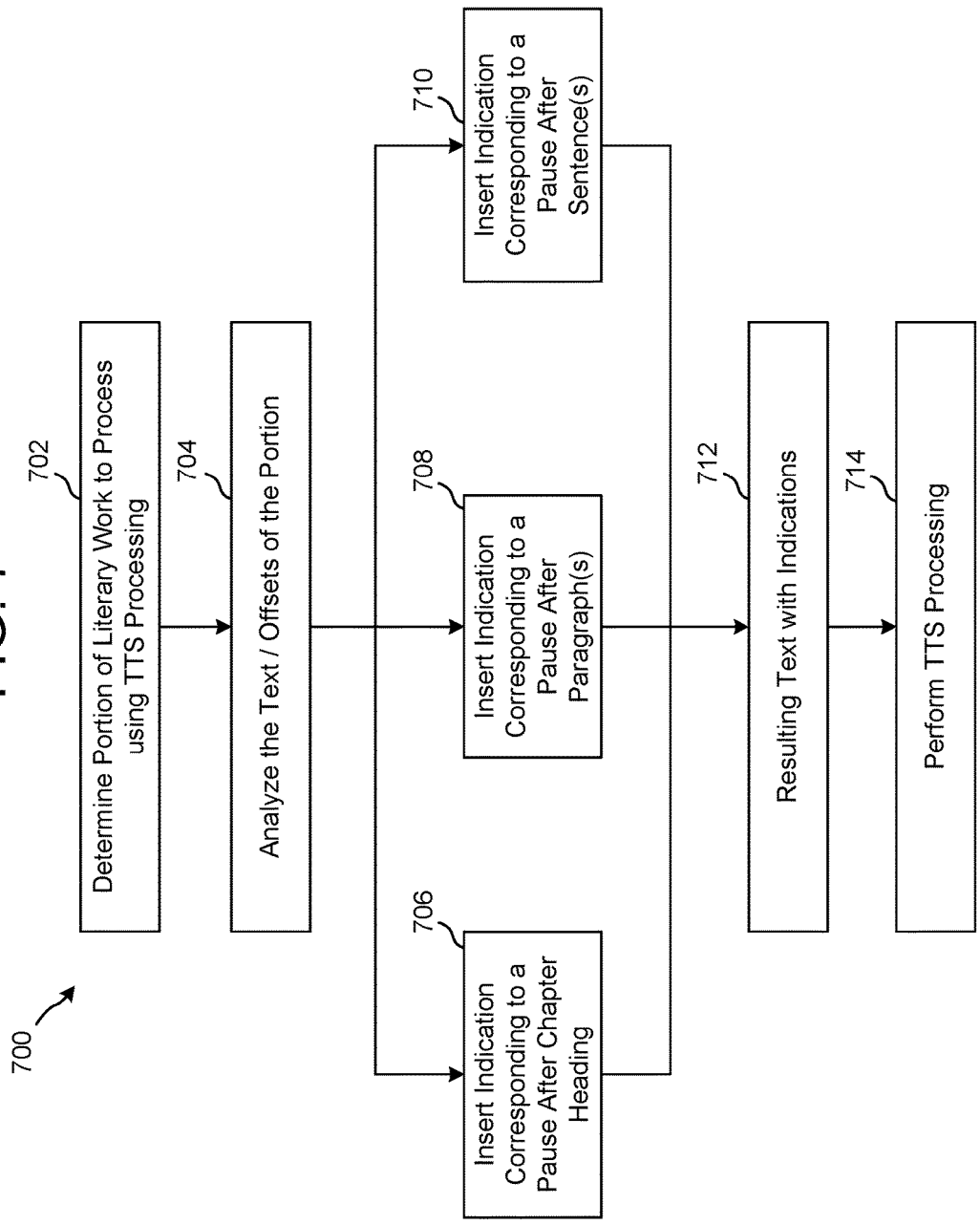
FIG. 7 illustrates a flow diagram illustrating insertion of indications of pauses according to embodiments of the present disclosure.

When TTS processing does not have enough content or text to process, the audio output may tend to cause chapter titles, paragraphs, and/or sentences to run together without appropriate intervening pauses. To cure this issue, an indication may be inserted into the text to cause pauses to be implemented during TTS processing. The pause lengths may vary from short pauses (for example about 500 milliseconds) to longer pauses (for example 1 second or more). The different length pauses may be used based on the context of the text, for example a sentence break may call for a shorter pause than a paragraph break, which may call for a shorter pause than a chapter break, etc. FIG. 7 is a flow diagram 700 illustrating insertion of indications of pauses according to embodiments of the present disclosure. As shown, the system may determine a portion of the literary work to process using TTS processing, illustrated as block 702. It should be appreciated that the portion may correspond to a position in the literary work where the user last left off based on information in the user's profile.

The system may analyze the text and offsets of the portion, illustrated as block 704. The system may then optionally insert an indication corresponding to a pause after one or more chapter headings, illustrated as block 706. The system may optionally insert an indication corresponding to a pause after one or more paragraphs, illustrated as block 708. The system may optionally insert an indication corresponding to a pause after one or more sentences, illustrated as block 710.

When the system is finished inserting the indications corresponding to the pauses, the resulting text of the portion of the literary work with the indications, illustrated as block 712 may be used to perform TTS processing on the portion with the indications, illustrated as block 714. The indication corresponding to the pauses may instruct the TTS processing to insert a pause, for example of about 500 milliseconds or larger into the audio output. This may cause the audio output to pause, for example after the chapter heading (i.e., Chapter One) prior to starting the first paragraph of the chapter, etc. This may result in a more natural audio output of the portion of the literary work.

The resulting text of the portion of the literary work with the indications may be cached or stored. For example, cached text with indications may remain available for less than about 2 days, while stored text with indication may remain in a data store for a longer period of time.

All of the methods describe with reference to FIGS. 4-7 may be combined with one another to increase the quality of the TTS processing as deemed necessary.

Figure 8:
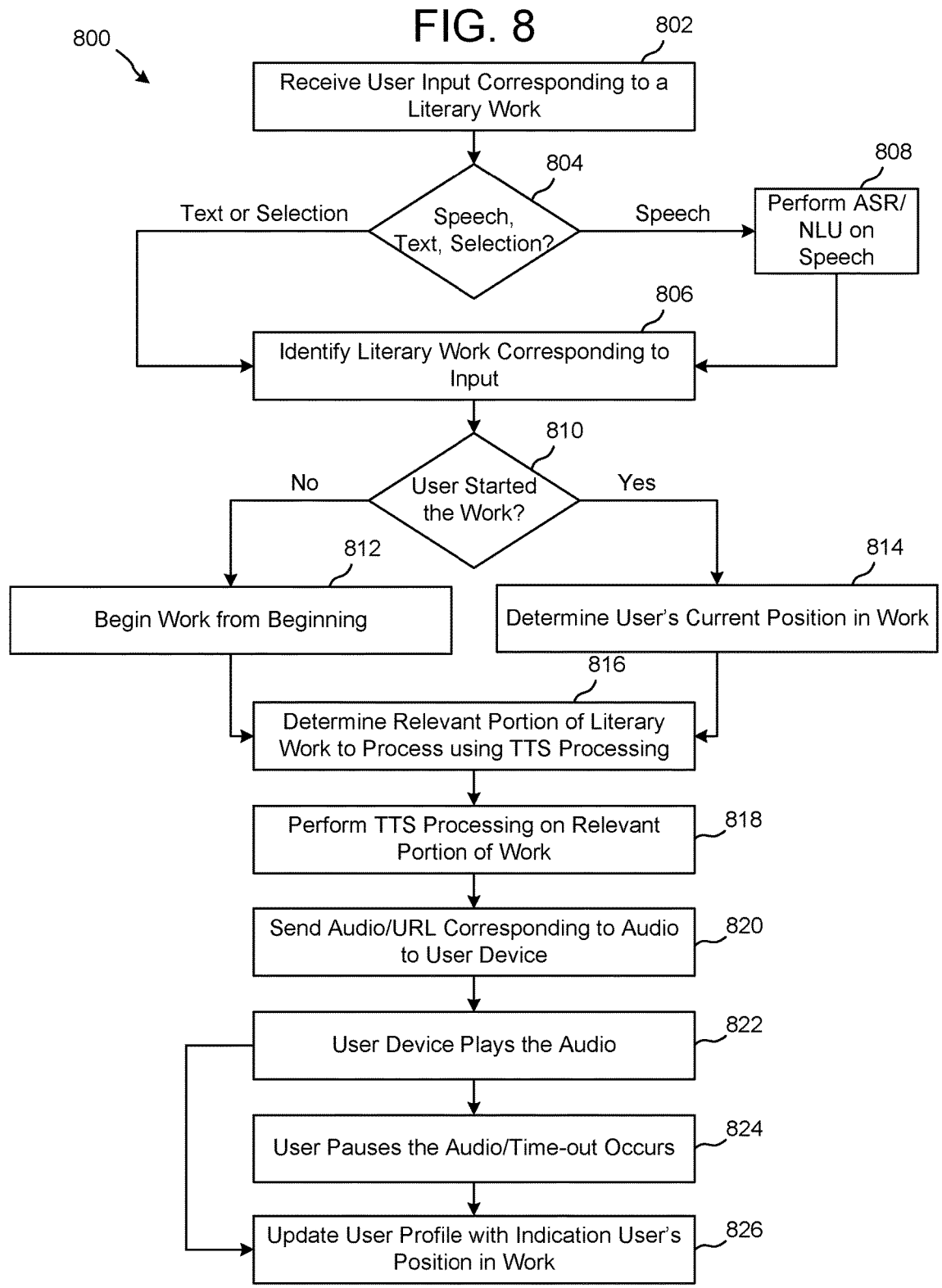
FIG. 8 illustrates an overview of a process for providing an audio output of a textual work, such as literary work, according to embodiments of the present disclosure.

FIG. 8 illustrates an overview of a process 800 for providing an audio output of a textual work, such as literary work, according to embodiments of the present disclosure. As shown, the system may receive an input from a user via a user device corresponding to a literary work, illustrated as block 802. The input may be a speech input (i.e., audio data), a text input, or a selection. The system determines whether the input corresponds to a speech input (i.e., audio data), a text input, or some other selection (for example, a selection on a touchscreen of a device), illustrated as block 804. When the input is a text input or a selection, the system identifies the literary work corresponding to the input, illustrated as block 806. When the input is a speech input, the system processes the input using ASR and/or NLU processing techniques as known in the art, illustrated as block 808, and identifies the literary work corresponding to the input, illustrated as block 806. It should be appreciated that the system may identify the literary work by title, author, common character, etc.

Once the literary work is identified, the system determines whether the user has previously started the literary work, illustrated as block 810. This may be determined by reference a user profile associated with the user. If the user profile indicates that the user has not previously began the literary work, the system determines to begin the literary work from the beginning, illustrated as block 812. If the user profile indicates that the user has previously began the literary work, the system determines the user's position within the literary work, illustrated as block 814.

The system then determines the relevant portion of the literary work to perform TTS processing on, illustrated as block 816. This determination may include performing one or more of the steps described above with regard to FIGS. 2-7. Once the relevant portion of text of the literary work is determined, the system performs TTS processing on the portion of the literary work, illustrated as block 818. The TTS processing may be performed using the techniques described above.

The system may send the resulting audio output or a URL corresponding to the resulting audio output of the TTS processing to the user device, illustrated as block 820. The user device may access the URL and/or simply play the audio output via speaker(s), illustrated as block 822. While the audio output is playing, the system may periodically update the user profile of the user with an indication of where the user is currently at, such as an indication of the time location of the position within the audio output and/or offset(s) corresponding to the word(s) of the text of the position, illustrated as block 826.

The system continues to process the subsequent portion of the literary work to provide the user with a seamless audio output experience (i.e., the reading of one paragraph after another) until the user desires to stop the audio output, for example, by pausing or stopping the audio output via the user device. In the event the user pauses or stops the audio from playing, or a time-out occurs (such as a sleep type timer), illustrated as block 824, the system may update the user profile of the user with an indication of where the pause/stop/time-out occurs, illustrated as block 826. As described above, the user profile may be updated with an indication of the time location of the pause/stop/time-out within the audio output and/or offset(s) corresponding to the word(s) of the text where the pause/stop/time-out occurred.

Figure 9:
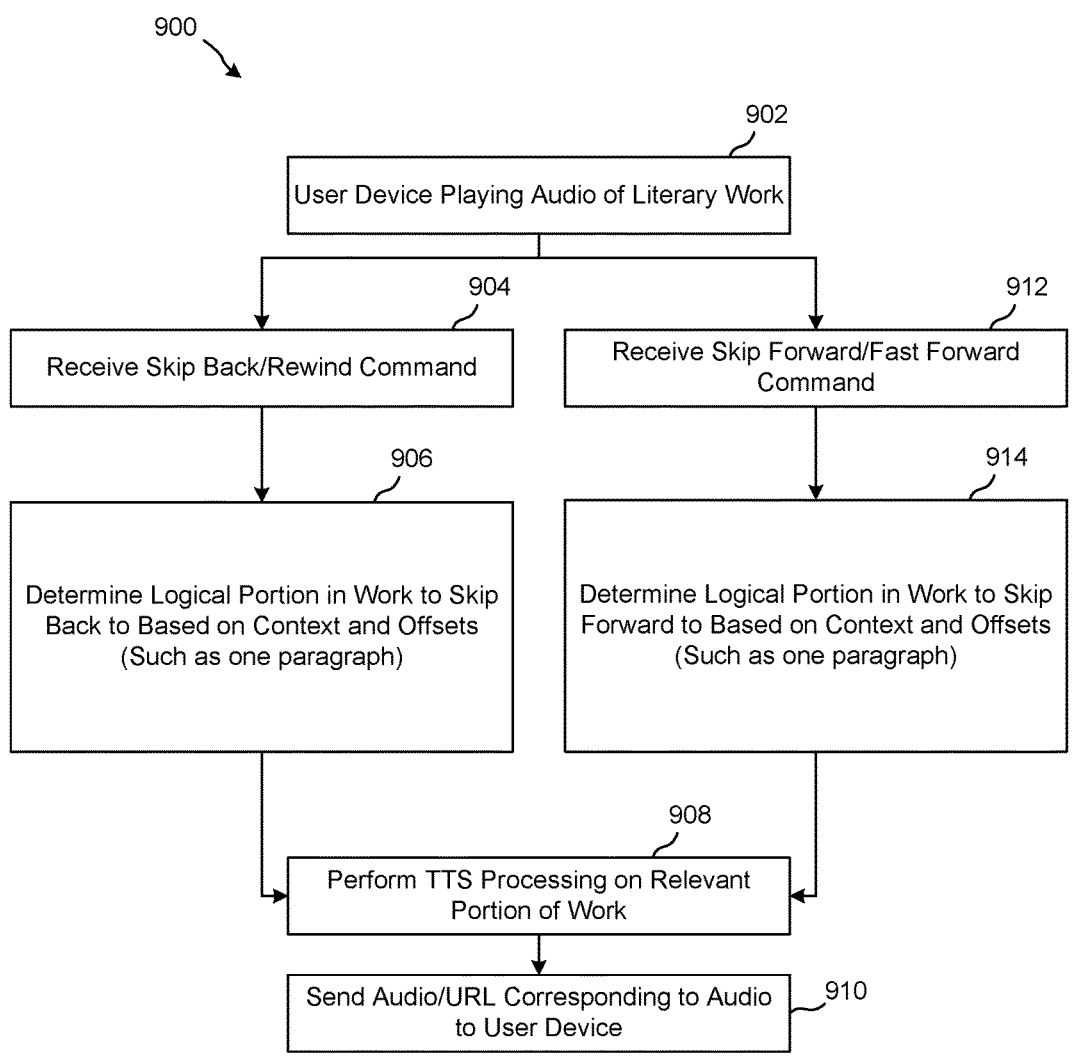
FIG. 9 illustrates an overview of a process for skipping back or skipping forward within a literary work according to embodiments of the present disclosure.

The system also allows the user to skip back or rewind, and skip forward or fast forward within the literary work. The amount of text to skip back or skip forward may be determined based on paragraph offsets, sentence offsets, word offsets, etc. FIG. 9 illustrates an overview of a process 900 for skipping back or skipping forward within a literary work according to embodiments of the present disclosure. As shown, the user device may be playing the audio output from the TTS processing, illustrated as block 902. When the user desired to skip backward within the literary work, the user may input a skip back command via the user device.

The system may receive the skip back command, illustrated as block 904. The system may then determine a logical portion of the literary work to skip back to based on the offsets, context, etc., illustrated as block 906. The system then performs TTS processing of the relevant portion of the literary work, illustrated in block 908, and sends the resulting audio output or a URL corresponding to the resulting audio output of the TTS processing to the user device, illustrated as block 910.

When the user desired to skip forward within the literary work, the user may input a skip forward command via the user device. The system may receive the skip forward command, illustrated as block 912. The system may then determine a logical portion of the literary work to skip forward to based on the offsets, context, etc., illustrated as block 914. The system then performs TTS processing of the relevant portion of the literary work, illustrated s block 908, and sends the resulting audio output or a URL corresponding to the resulting audio output of the TTS processing to the user device, illustrated as block 910.

As described above, TTS processing produces higher quality, more natural audio output with increasing amounts of content. To provide high quality, natural audio output, the amount of text selected for TTS processing is selected by the system according to varying degrees of constraints to ensure the text being processed via TTS processing includes a sufficient amount of context. Thus, the logical portion to skip back to or skip forward to may be determined based on offsets, context, etc., for example, as described above with respect to FIGS. 3-6. For example, to provide sufficient content for TTS processing, the system may skip back or skip forward one or more paragraphs at a time in order to provide high quality natural audio output.

The notion of using the logical portion to skip back to or skip forward to may also be extended to non TTS based works. This may allow a more natural place to skip back to or skip forward to in an audio work, instead of simply rewinding 10 seconds of audio, for example. Metadata of such works may also be used to determine the logical portion to skip back to or skip forward to in order to provide a more natural user experience.

The system may include multiple components, multiple devices may contain components of the system, and the devices may be connected over a network. FIGS. 10A-10F illustrate an overview of a sequence diagram of communications between components according to embodiments of the present disclosure. As illustrated in FIGS. 10A-10F, the system may include the user device 102, a listener module 1002, a look-up data store 1004, an ASR/NLU module 202, a platform 1008, a TTS gateway 203, an audio driver gateway 1012, an activity feed gateway 1014, an eBook speechlet 216, a play queue module 206, an eReader module 210, and a TTS engine/URL module 214/212. One or more of the components, except the user device 102, may be part of the multiple servers 104. That is, the different components may be distributed among multiple different physical devices that exchange data as illustrated below to complete the desired operations. For example, one device may actually capture audio from a user, another device may handle ASR and/or NLU processing, another device may store the text corresponding to textual works, another device may store user profiles, another device may perform TTS processing, etc. Certain functions may also be combined on a device depending on system configuration.

Figure 10A:
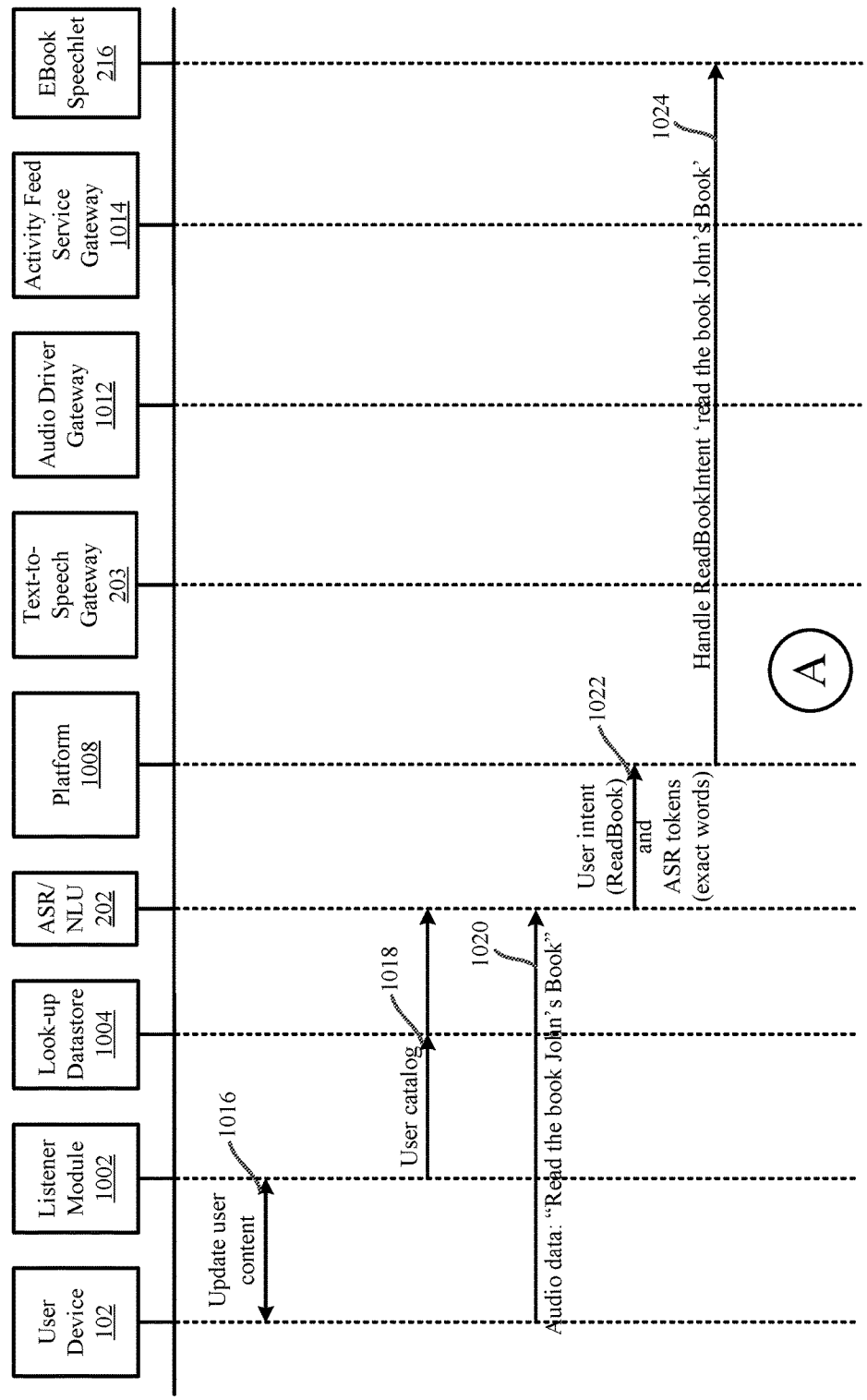

Referring to FIG. 10A, the user device 102 may communicate with the listener module 1002 to update user content with the user device 102, including purchases, returns, recently accessed items, etc. the user has performed, including eBook purchases and accessed, illustrated as 1016. The listener module 1002 may communicate the user's catalogue of purchased and accessed items, including eBooks purchased and accessed to the look-up datastore 1004, illustrated as 1018. The look-up datastore 1004 may also obtain the entire eBook catalogue available and send it or make it available to the ASR/NLU module 202, also illustrated as 1018. This provides a reference for the system to access when a user inputs audio speech to identify an eBook to have played via TTS processing.

For example, when the user desires to have the book "John's Book" played via audio output of TTS processing, the user may speak the utterance "Read the book John's Book" into the microphone of the user device 102. The user device 102 sends the audio data corresponding to the utterance to the ASR/NLU module 202, illustrated as 1020. The ASR/NLU module 202 processes the input speech audio using ASR and/or NLU techniques, as known in the art. The ASR/NLU module 202 then sends the user intent (i.e., read book) and ASR/NLU results (i.e., Read the book John's Book) to the platform 1008, illustrated as block 1022. The platform 1008 sends a message to the eBook speechlet 216 to handle the user's intent—read the book John's Book, illustrated as 1024.

Referring to FIG. 10B, the eBook speechlet 216 refines the user intent received from the platform 1008 if necessary, illustrated as 1026. In this respect, the eBook speechlet 216 communicates with the eReader Module 210 to obtain the user's library, last position heard, recently streamed audio information, etc., illustrated as 1028. Thus the system may determine (through the user's profile or otherwise) if the user is permitted to access the particular work in question (e.g., has purchased or is otherwise permitted to access John's Book). The eReader Module 210 may communicate with the user profile of the user to obtain some or all of the requested information. The eReader module 210 communicates the requested information back to the eBook speechlet 216, illustrated as 1030. The eBook speechlet 216 uses the received information to determine what book to play, illustrated as 1032, and complete the read book intent, illustrated as 1034.

When the read book intent is complete, the eBook speechlet 216 send a message to the play queue module 206 instructing the play queue module 206 to create a play queue with John's Book chapters, illustrated as 1036. The play queue module 206 attempts to create the play queue and sends a play queue created/failure message to the eBook speechlet 216, illustrated as 1038.

Figure 10C:
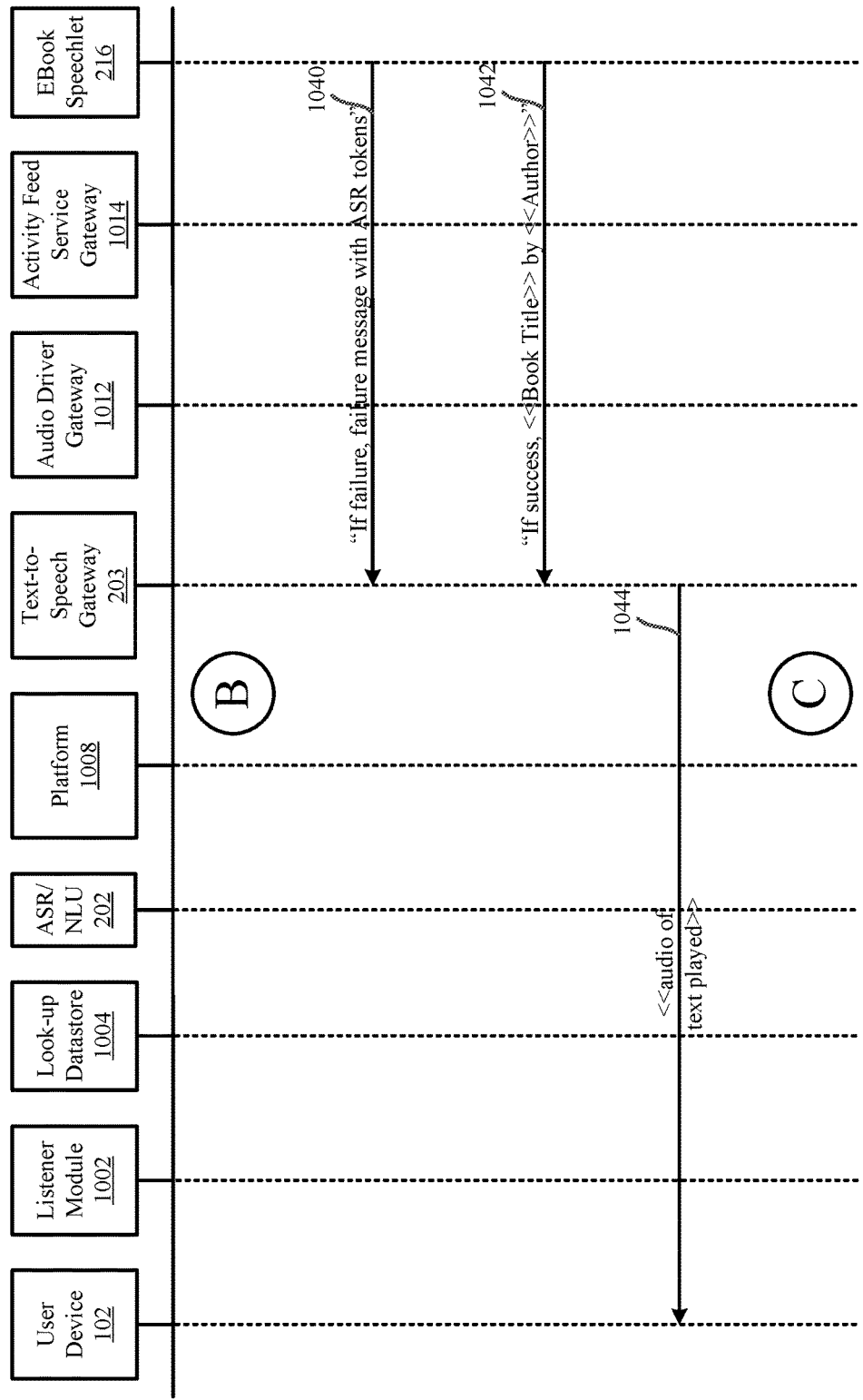

Referring to FIG. 10C, the eBook speechlet 216 receives the play queue created/failure message and sends and instruction to the TTS gateway 203 to either send a failure message (for example, you do not have that book, would you like to purchase it?, that book does not exist, etc.), illustrated as 1040; or a success message (for example, John's Book will begin playing shortly, etc.), illustrated as 1042, to the user device 102. The TTS gateway 203 sends an audio output of the appropriate message to the user device 102. In this example, a success message is sent, illustrated as 1044.

Referring to FIG. 10D, when the success message is sent, the eBook speechlet 216 sends a message to the play queue module 206 to fetch a URL corresponding to audio of the first entry in the queue, illustrated as 1046. The play queue module 206 determines the logical portion of the book John's Book to obtain, for example using the methods described above. For example, a number of paragraphs where the user left off in the book (if the user has already begun the book) or the first few paragraphs of the book (if the user has not begun the book). The eBook speechlet 216 may also work with the play queue module 206 to determine the portions of the book to obtain. The play queue module 206 then sends a message to the eReader module 210 asking for the determined portion, illustrated as 1048. The eReader module 210 returns the raw text of the requested portion, which may include offsets as described above, illustrated as 1050. The play queue module 206 and eBook speechlet 216 may also work together to insert the offsets.

Figure 10E:
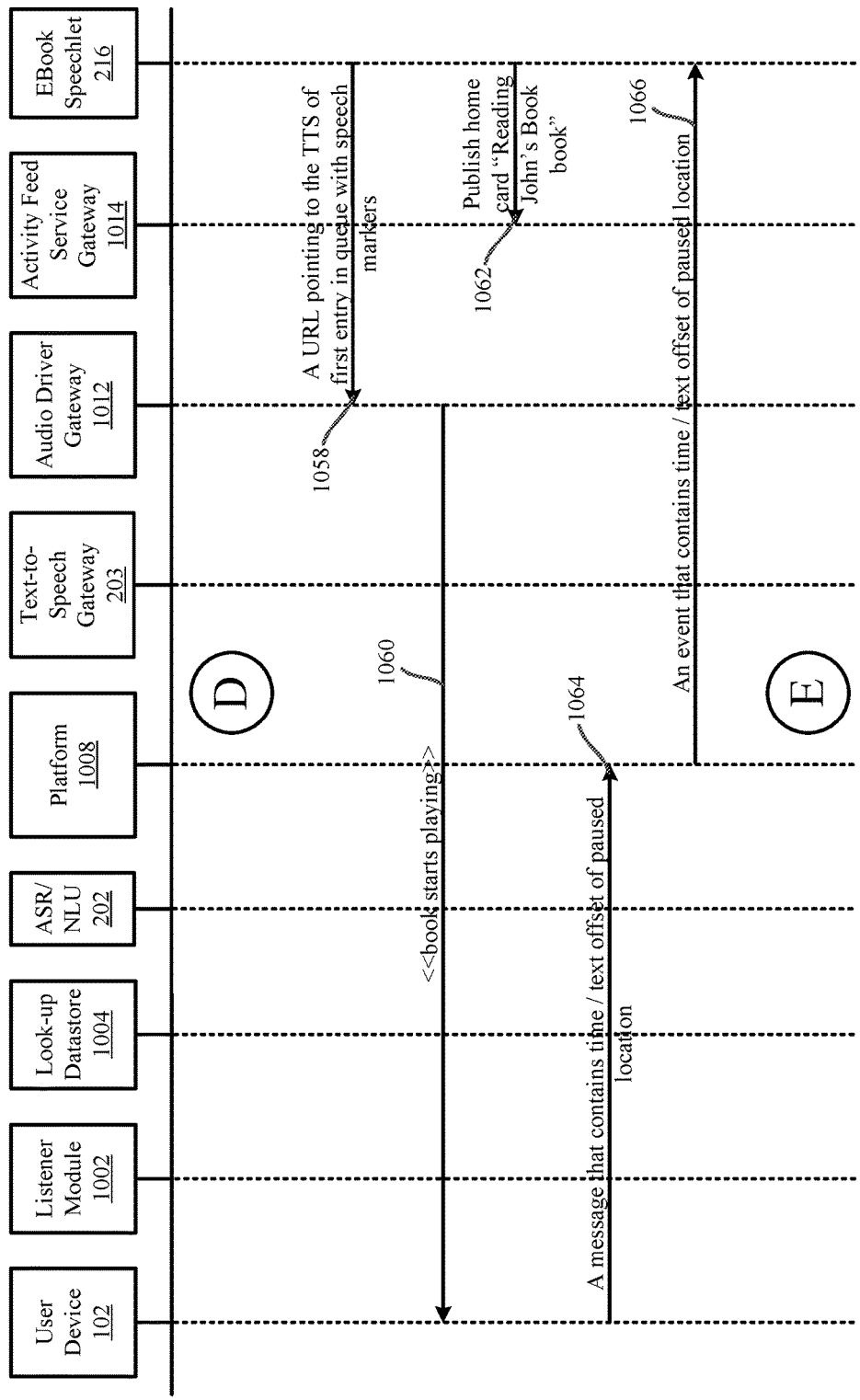

The play queue module 206 then sends a message to the TTS engine/URL module 214/212 including the text to be processed via TTS processing, illustrated as 1052. The TTS engine/URL module 214/212 processes the text and sends a URL pointing to the TTS results, illustrated as 1054. As described above, the TTS results may also include speech markers identifying timestamps for each word. The play queue module 206 forwards the URL to the eBook speechlet 216, illustrated as 1056. Referring to FIG. 10E, the eBook speechlet 216 in turn sends the URL to the audio driver gateway 1012, illustrated as 1058. The audio driver gateway 1012 communicates the URL to the user device 102, illustrated as 1060. The user device 102 then access the URL, receives the audio output data from the TTS processing and begins playing the portion of the book John's Book. The eBook speechlet 216 may also publish the reading of John's Book to the activity feed service gateway 1014, illustrated as 1062. This allows the system to monitor the activity on the system.

The system may repeat the steps illustrated as 1046-1060 for the second entry on the queue (such as the next portion of the book), the third entry, fourth entry, etc. to provide a seamless playing of the book one paragraph after another until the user pauses or stops the playing of the book. As the TTS device is processing text it may track the amount of text that is queued and waiting to undergo TTS processing. If the text gets below a certain threshold, the TTS device, for example through the TTS gateway 203, may send a message to a remote device, such as the play queue 206, ereader module 210, or other component, that additional text is request for TTS processing. Additional text corresponding to one or more contextual portions may then be sent from the remote device to the TTS device to refill the text queue awaiting TTS processing.

Referring to FIG. 10E, when the user pauses or stops the playing of the audio of the book, the user device 102 sends a message containing the time and offsets of the location where the book was paused or stopped to the platform 1008, illustrated as 1064. The platform 1008 then sends a message corresponding to an event that contains the time and offsets of the location where the book was paused or stopped to the eBook speechlet 216, illustrated as 1066.

Referring to FIG. 10F, the eBook speechlet 216 sends a message to the play queue module 206 to update the user profile with the location of the pause/stop in response to the pause/stop, illustrated as 1068. In response, the play queue module 206 obtains the same raw text with offsets for each word corresponding to the audio output that was playing on the user device 102 from the eReader module 210, illustrated as 1070. The play queue module 206 cross checks the text offsets from the eReader module 210 with the offsets received from the user device 102 to determine where the user left off within the book, illustrated as 1072. The play queue module 206 then causes the position where the user left off to be written to the user profile by sending a message to the eReader module 210. Thus, when the user desires to continue playing the audio of the book, the system can retrieve the position where the user last stopped playing the book. The system can then use this position to determine which portion of the book to select for TTS processing the next time the user desires to resume the book.

The system may also store the audio output of the TTS processing for later use with the same user or another user desires to play that portion of the same book. Alternatively, the audio output of the TTS processing may only be cached for a set duration (e.g., 10 minutes, 1 day, etc.) and accessibly by the user who caused the TTS result to be produced, and then deleted. By removing the only allowing one user to access the TTS results and removing the results after they are consumed, avoids an inadvertent case where a public reading of the book is created, which may not be permitted in accordance with the rights of the owner of the book.

As mentioned above with respect to FIG. 2, prior to performing TTS processing on a literary work or other textual work, the system may check to determine whether the particular work is TTS enabled. Certain publishers may specify the right provided, including whether the work is TTS disabled or TTS enabled, and if the work in TTS enabled what languages the work is TTS enabled for.

Thus, in order to comply with a license to the work, for example, the system may check whether the work is TTS enabled or disabled, and what languages are allowed. If a user is requesting TTS processing and playing of a work that is not TTS enabled or is TTS enabled only for a particular language (and the language is not the language the user wants), the system may inform the user via the user device that the work is not supported for reading.

However, TTS processing may be allowed even if the work is TTS disabled or only enabled for a certain language, if the user is visually impaired. Thus, the system may flag users that are visually impaired, for example by placing an indication in the particular user's profile. The use may be determined to be visually impaired based on the user device using a screen reader device or a screen magnifier. When the use of a screen reader device or a screen magnifier is detected, the system may record an indication in a database relating to customer profile information. The indication may correspond to print impaired. Prior to performing TTS processing on a work, the system may check for the print impair indication, and if the indication is present, the system may ignore any TTS disabled indication on a work associated with any eBooks and perform the TTS processing.

Figure 11:
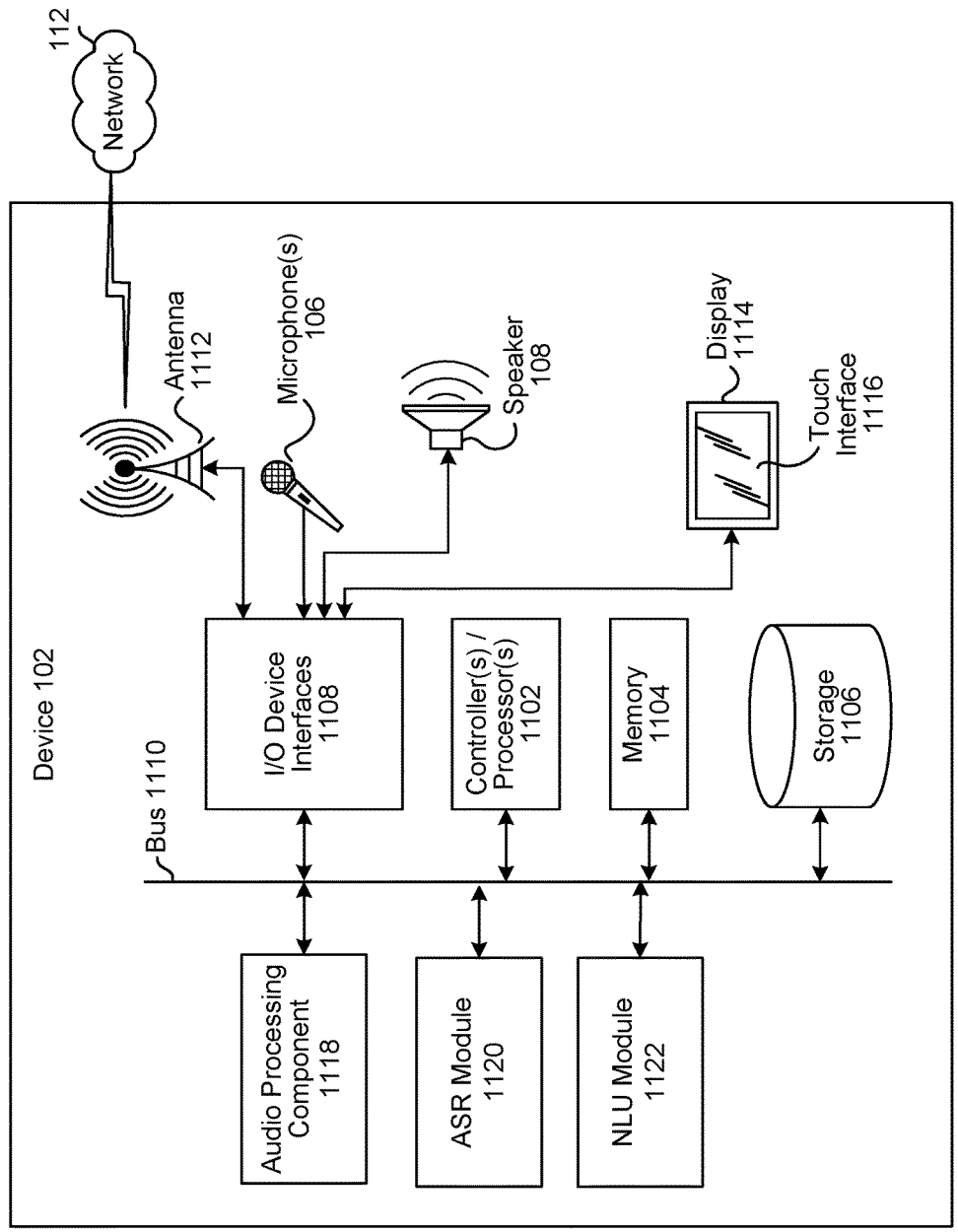
FIG. 11 illustrates a block diagram conceptually illustrating a user device that may be used with the system according to embodiments of the present disclosure.
Figure 12:
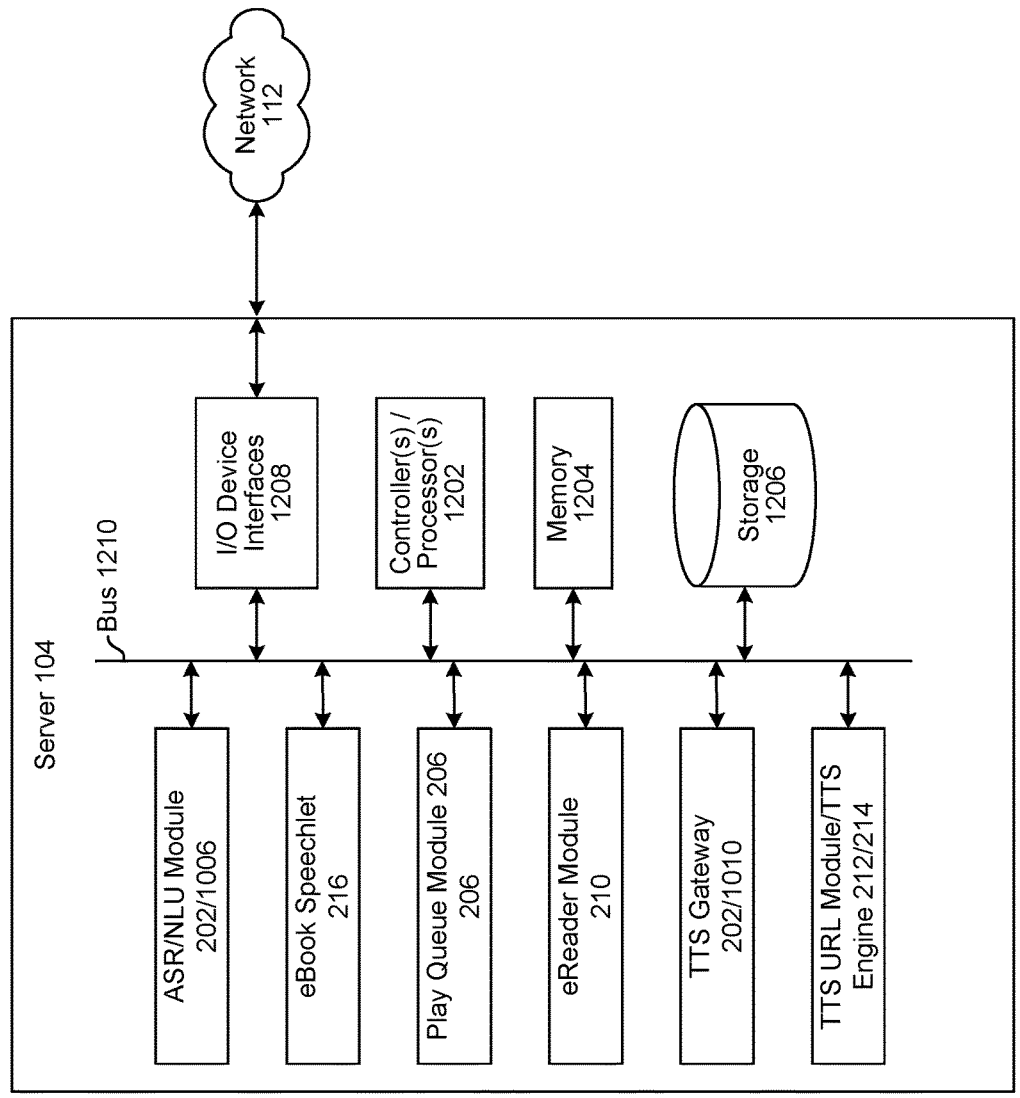
FIG. 12 illustrates is a block diagram conceptually illustrating example components of a remote device, such as server(s), that may be used with the system according to embodiments of the present disclosure.

Although the above discusses a system, one or more components of the system may reside on any number of devices. FIG. 11 is a block diagram conceptually illustrating a user device 102 that may be used with the described system and may incorporate certain aspect of the system. FIG. 12 is a block diagram conceptually illustrating example components of a remote device, such as server(s) 104, that may determine which portion of a textual work to perform TTS processing on and perform TTS processing to provide an audio output to the user device 102. Multiple such servers 104 may be included in the system, such as one server 104 for ASR/NLU processing, one server 104 for determining the portion of the textual to process using TTS processing, one server 104 for performing TTS processing, etc. In operation, each of these devices may include computer-readable and computer-executable instructions that reside on the respective device (102/104), as will be discussed further below.

Each of these devices (102/104) may include one or more controllers/processors (1102/1202), that may each include a central processing unit (CPU) for processing data and computer-readable instructions, and a memory (1104/1204) for storing data and instructions of the respective device. The memories (1104/1204) may individually include volatile random access memory (RAM), non-volatile read only memory (ROM), non-volatile magnetoresistive (MRAM) and/or other types of memory. Each device may also include a data storage component (1106/1206), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1108/1208). The storage component 1106/1206 may include storage for various data including ASR models, NLU knowledge base, entity library, speech quality models, TTS voice unit storage, and other storage used to operate the system.

Computer instructions for operating each device (102/104) and its various components may be executed by the respective device's controller(s)/processor(s) (1102/1202), using the memory (1104/1204) as temporary "working" storage at runtime. A device's computer instructions may be stored in a non-transitory manner in non-volatile memory (1104/1204), storage (1106/1206), or an external device(s). Alternatively, some or all of the executable instructions may be embedded in hardware or firmware on the respective device in addition to or instead of software.

Each device (102/104) includes input/output device interfaces (1108/1208). A variety of components may be connected through the input/output device interfaces, as will be discussed further below. Additionally, each device (102/104) may include an address/data bus (1110/1210) for conveying data among components of the respective device. Each component within a device (102/104) may also be directly connected to other components in addition to (or instead of) being connected to other components across the bus (1110/1210).

Referring to the device 102 of FIG. 11, the input/output device interfaces 1108 connect to a variety of components such as an audio output component such as a speaker 108, a wired headset or a wireless headset (not illustrated) or an audio capture component. The audio capture component may be, for example, a microphone 106, a wired headset or a wireless headset (not illustrated), etc. The device 102 (using microphone 106) may be configured to receive audio input and determine audio data corresponding to the captured audio input. The device 102 (using input/output device interfaces 1108, antenna 1112, etc.) may also be configured to transmit the audio data to server 104 for further processing as an audio input.

For example, via the antenna(s), the input/output device interfaces 1108 may connect to one or more networks 112 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 112, the speech processing system may be distributed across a networked environment.

The device 102 may also include a display 1114 having a touch interface 1116. The display 1114 may be a display of any suitable technology, such as a liquid crystal display, an organic light emitting diode display, electronic paper, an electrochromic display, a cathode ray tube display, a pico projector or other suitable component(s).

The device 102 may also include an audio processing component 1118. The audio processing component 1118 may processes the URL received from the system and play audio corresponding to the URL via speaker 108.

The device 102 may also include an ASR module 1120 and a NLU module 1122. The ASR module 1120 may be of limited or extended capabilities. If limited speech recognition is included, the ASR module 1120 may be configured to identify a limited number of words, such as wakewords detected by the device, whereas extended speech recognition (such as on a server 104) may be configured to recognize a much larger range of words. The NLU module in device 102 may be of limited or extended capabilities. The NLU module 1122 may comprise and intent classification module and/or other components.

One or more servers 104 may include the ASR/NLU module 202 capable of extended ASR and/or NLU processing to identify spoken commands and input audio from the user device 102, as described above. The one or more servers 104 may also include the eBook speechlet 216, the play queue module 206, the eReader module 210, the TTS gateway 203, the TTS URL module and TTS engine 212/214, as well as the other components described above, all capable of performing the functions described above.

As described above, the storage component 1206 may include storage for various data including ASR models, NLU knowledge base, entity library, speech quality models, TTS voice unit storage, and other storage used to operate the system and perform the algorithms and methods described above. The storage component 1206 may also store information corresponding to a user profile, including purchases of the user, returns of the user, recent content accessed, etc.

As noted above, multiple devices may be employed in a single system. In such a multi-device system, each of the devices may include different components for performing different aspects of the system. The multiple devices may include overlapping components. The components of the devices 102 and server(s) 104, as described with reference to FIGS. 11 and 12, are exemplary, and may be located a stand-alone device or may be included, in whole or in part, as a component of a larger device or system.

Figure 13:
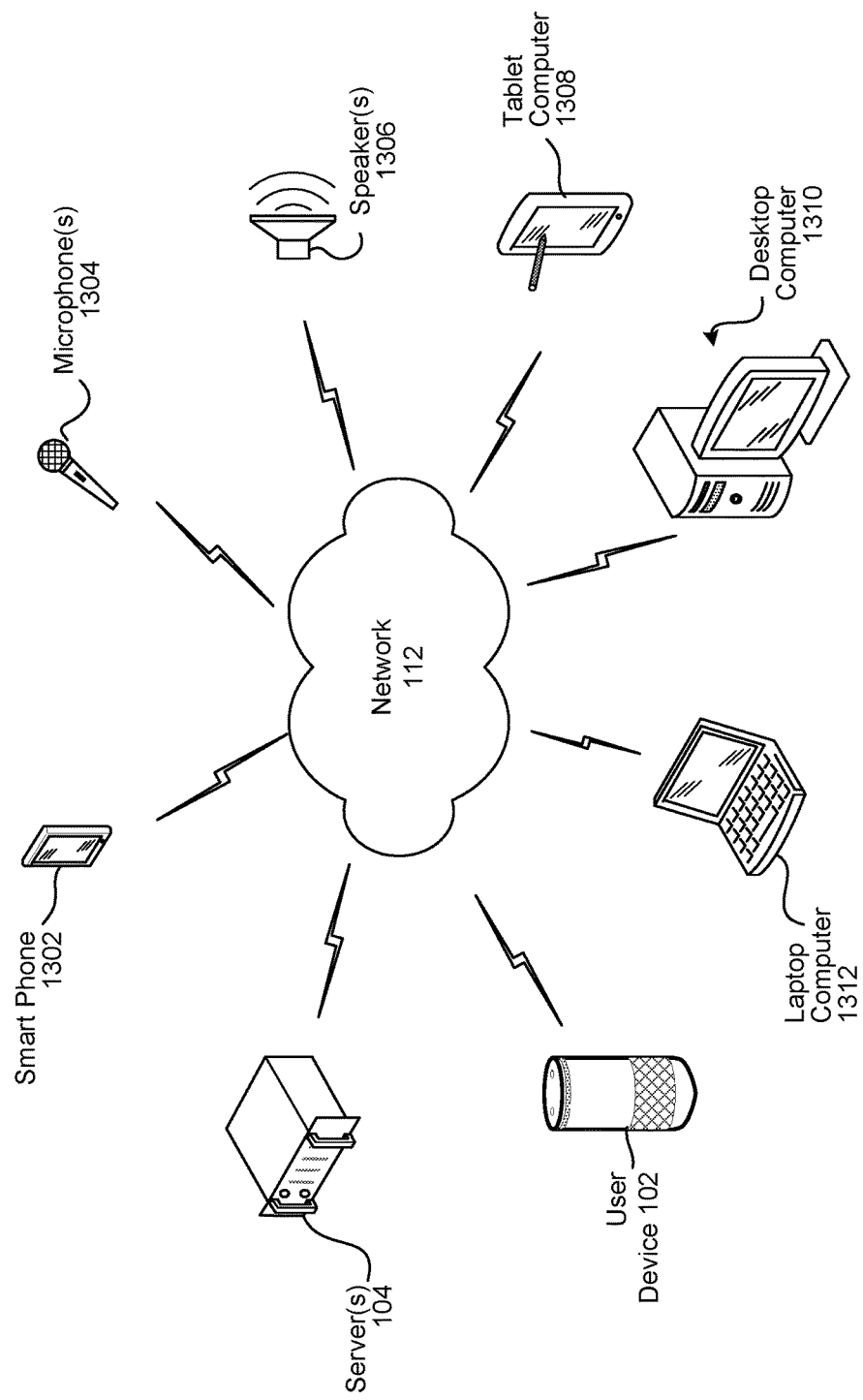
FIG. 13 illustrates a diagram conceptually illustrating distributed computing environment according to embodiments of the present disclosure.

As illustrated in FIG. 13, multiple devices may contain components of the system and the devices may be connected over a network 112. The network 112 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 112 through either wired or wireless connections. Network 112 may include a local or private network or may include a wide network such as the internet. For example, device 102, server(s) 104, smart phone 1302, networked microphone(s) 1304, networked audio output speaker(s) 1306, tablet computer 1308, desktop computer 1310, laptop computer 1312, etc. may be connected to the network 112 through a wireless service provider, over a WiFi or cellular network connection or the like.

As described above, the device 102, may be associated with a user profile. For example, the device 102 may be associated with a user identification (ID) number or other profile information linking the device to a user account. The user account/ID/profile may be used by the system to perform speech controlled commands (for example commands discussed above). The user account/ID/profile may be associated with particular model(s) or other information used to identify received audio, classify received audio (for example as a specific sound described above), determine user intent, determine user purchase history, content accessed by or relevant to the user, etc.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components, modules and engines may be implemented as in firmware or hardware, including digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for performing text-to-speech (TTS) processing on sections of a textual work, the method comprising:
    processing a textual work to determine paragraph breaks within the textual work;
    storing a plurality of paragraph indicators, the paragraph indicators corresponding to the paragraph breaks;
    receiving first audio data from a user device, the audio data corresponding to a spoken utterance from a user;
    performing speech recognition processing on the first audio data;
    determining that the first audio data corresponds to a request to play audio corresponding to the textual work;
    determining a start position within the textual work at which playing of the audio corresponding to the textual work is to begin, the start position corresponding to the request;
    determining that the start position is between a first paragraph indicator and a second paragraph indicator, wherein the first paragraph indicator corresponds to a beginning of a first paragraph and the second paragraph indicator corresponds to a break between the first paragraph and a second paragraph;
    determining first text corresponding to an entirety of the first paragraph, wherein the first text includes a first portion that precedes the last user position and a second portion that follows the last user position;
    with a TTS engine configured to synthesize speech based on input text, performing TTS processing on the first text to determine second audio data corresponding to the second portion, the TTS processing including:
        accessing stored data that indicates how respective phonetic units in processed text are to be pronounced based at least in part on positions of the respective phonetic units relative to other elements in the processed text,
        determining, using the stored data and the first portion of the first text, at least one prosodic characteristic corresponding to at least one phonetic unit associated with the second portion of the first text, and
        determining the second audio data based at least in part on the at least one prosodic characteristic;
    determining an audio output component corresponding to the request; and
    causing audio, corresponding to the second audio data and beginning with audio corresponding to the second portion, to be output using the audio output component.

2. The computer-implemented method of claim 1, further comprising:
    determining second text corresponding to an entirety of the second paragraph;
    sending the second text for TTS processing prior to the second audio data completing playback at the user device;
    performing TTS processing on a first sentence of the second text to determine third audio data;
    sending the third audio data to the user device;
    performing TTS processing on a second sentence of the second text to determine fourth audio data;
    receiving an indication that playback of the third audio data was paused prior to completion of playback of the fourth audio data; and
    storing a user position indicator within the textual work, the user position indicator corresponding to the second paragraph indicator.

3. The computer-implemented method of claim 1, further comprising:
    determining second text corresponding to an entirety of the second paragraph;
    sending the second text for TTS processing prior to the second audio data completing playback at the user device;
    performing TTS processing on a first sentence of the second text to determine third audio data;
    sending the third audio data to the user device;
    performing TTS processing on a second sentence of the second text to determine fourth audio data;
    receiving an indication that playback of the third audio data was paused prior to completion of playback of the fourth audio data;
    determining a portion of the third audio data that was played back prior to being paused;
    determining a word in the second paragraph corresponding to an end of the portion; and
    storing a user position indicator within the textual work, the user position indicator corresponding to the word.

4. The computer-implemented method of claim 1, wherein determining the second audio data further comprises:

selecting, based at least in part on features of a linguistic representation of the second portion, a plurality of pre-stored audio waveforms in a database; and concatenating the plurality of pre-stored audio waveforms together to form the second audio data.

5. The computer-implemented method of claim 1, wherein determining the second audio data further comprises:

synthesizing an acoustic waveform based at least in part on features of a linguistic representation of the second portion.

6. A computer-implemented method comprising:

receiving an electronic communication;

processing the electronic communication to determine that the electronic communication comprises a request for audio output of at least a portion of a textual work;

determining a start position within the textual work at which the audio output is to begin, the start position corresponding to the request;

determining that the start position is within a first contextual portion of the textual work, wherein first text data that corresponds to an entirety of the first contextual portion includes at least a first portion that precedes the start position and a second portion that follows the start position;

with a text-to-speech (TTS) engine configured to synthesize speech based on input text, performing TTS processing on the first text data to determine first audio data corresponding to the second portion, the TTS processing including:

accessing stored data that indicates how respective phonetic units in processed text are to be pronounced based at least in part on positions of the respective phonetic units relative to other elements in the processed text, determining, using the stored data and the first portion of the first text data, at least one prosodic characteristic corresponding to at least one phonetic unit associated with the second portion of the first text data, and determining the first audio data based at least in part on the at least one prosodic characteristic;

determining an audio output component corresponding to the request; and causing audio, corresponding to the first audio data and beginning with audio corresponding to the second portion, to be output using the audio output component.

7. The computer-implemented method of claim 6, further comprising:

determining that the textual work corresponds to a non-audio formatted electronic book.

8. The computer-implemented method of claim 6, wherein the electronic communication comprises second audio data corresponding to a spoken utterance from a user, and wherein the processing of the electronic communication comprises:

performing speech recognition processing on the second audio data; and determining that the second audio data corresponds to the request.

9. The computer-implemented method of claim 8, wherein:

the audio output component is associated with a user device;

the receiving of the electronic communication comprises receiving, from the user device, the second audio data; and the causing of the audio to be output comprises sending, to the user device, the first audio data and a command to output the first audio data via the audio output component.

10. The computer-implemented method of claim 6, further comprising:

processing the textual work to determine paragraph breaks within the textual work;

storing a plurality of paragraph indicators, the paragraph indicators corresponding to the paragraph breaks; and determining that the first contextual portion corresponds to an entirety of a paragraph indicated by the paragraph indicators.

11. The computer-implemented method of claim 6, wherein the electronic communication is received from a user device, and wherein causing the audio to be output comprises sending, to the user device, the first audio data and a command to output the first audio data via the audio output component.

12. The computer-implemented method of claim 6, further comprising:

determining second text corresponding to an entire second contextual portion of text following the first contextual portion in the textual work; and beginning TTS processing on the second text prior to the first audio data completing output via the audio output component.

13. The computer-implemented method of claim 12, further comprising:

determining that the second text is below a text length threshold;

determining third text corresponding to an entire third contextual portion of text following the entire second contextual portion in the textual work; and beginning TTS processing on the third text prior to the first audio data completing output via the audio output component.

14. The computer-implemented method of claim 12, further comprising:

performing TTS processing on the second text to determine second audio data;

sending the second audio data to a device associated with the audio output component;

receiving an indication that output of the second audio data via the audio output component was paused prior to completion of output of the second audio data; and storing a position within the textual work, the position corresponding to a beginning of the second contextual portion.

15. The computer-implemented method of claim 12, further comprising:

performing TTS processing on the second text to determine second audio data;

sending the second audio data to a device associated with the audio output component;

receiving an indication that output of the second audio data via the audio output component was paused prior to completion of output of the second audio data;

determining a portion of the second audio data that was output prior to being paused;

determining a word in the second contextual portion corresponding to an end of the portion; and storing a position within the textual work, the position corresponding to the word.

16. The computer-implemented method of claim 6, wherein determining the first audio data further comprises:

selecting, based at least in part on features of a linguistic representation of the second portion, a plurality of pre-stored audio waveforms in a database; and concatenating the plurality of pre-stored audio waveforms together to form the first audio data.

17. The computer-implemented method of claim 6, wherein determining the first audio data further comprises:

synthesizing an acoustic waveform based at least in part on features of a linguistic representation of the second portion.

18. A computing system comprising:

at least one processor; and at least one memory including instructions operable to be executed by the at least one processor to cause the system to perform a set of actions comprising:

receiving an electronic communication;

processing the electronic communication to determine that the electronic communication comprises a request for audio output of at least a portion of a textual work;

determining a start position within the textual work at which the audio output is to begin, the start position corresponding to the request;

determining that the start position is within a first contextual portion of the textual work, wherein first text data that corresponds to an entirety of the first contextual portion includes at least a first portion that precedes the start position and a second portion that follows the start position;

with a text-to-speech (TTS) engine configured to synthesize speech based on input text, performing TTS processing on the first text data to determine first audio data corresponding to the second portion, the TTS processing including:

accessing stored data that indicates how respective phonetic units in processed text are to be pronounced based at least in part on positions of the respective phonetic units relative to other elements in the processed text, determining, using the stored data and based at least in part on the first portion of the first text data, at least one prosodic characteristic corresponding to at least one phonetic unit associated with the second portion of the first text data, and determining the first audio data based at least in part on the at least one prosodic characteristic;

determining an audio output component corresponding to the request; and causing audio, corresponding to the first audio data and beginning with audio corresponding to the second portion, to be output using the audio output component.

19. The computing system of claim 18, wherein the electronic communication comprises second audio data corresponding to a spoken utterance from a user, and wherein the processing of the electronic communication comprises:

performing speech recognition processing on the second audio data; and determining that the second audio data corresponds to the request.

20. The computing system of claim 19, wherein:

the audio output component is associated with a user device;

the receiving of the electronic communication comprises receiving, from the user device, the second audio data; and the causing of the audio to be output comprises sending, to the user device, the first audio data and a command to output the first audio data via the audio output component.

21. The computing system of claim 18, wherein the set of actions further comprises:

processing the textual work to determine paragraph breaks within the textual work;

storing a plurality of paragraph indicators, the paragraph indicators corresponding to the paragraph breaks; and determining that the first contextual portion corresponds to an entirety of a paragraph indicated by the paragraph indicators.

22. The computing system of claim 18, wherein the electronic communication is received from a user device, and wherein causing the audio to be output comprises sending, to the user device, the first audio data and a command to output the first audio data via the audio output component.

23. The computing system of claim 18, wherein the set of actions further comprises:

determining second text corresponding to an entire second contextual portion of text following the first contextual portion in the textual work; and beginning TTS processing on the second text prior to the first audio data completing output via the audio output component.

24. The computing system of claim 23, wherein the set of actions further comprises:

determining that the second text is below a text length threshold;

determining third text corresponding to an entire third contextual portion of text following the entire second contextual portion in the textual work; and beginning TTS processing on the third text prior to the first audio data completing output via the audio output component.

25. The computing system of claim 23, wherein the set of actions further comprises:

performing TTS processing on the second text to determine second audio data;

sending the second audio data to a device associated with the audio output component;

receiving an indication that output of the second audio data via the audio output component was paused prior to completion of output of the second audio data; and storing a position within the textual work, the position corresponding to a beginning of the second contextual portion.

26. The computing system of claim 23, wherein the set of actions further comprises:

performing TTS processing on the second text to determine second audio data;

sending the second audio data to a device associated with the audio output component;

receiving an indication that output of the second audio data via the audio output component was paused prior to completion of output of the second audio data;

determining a portion of the second audio data that was output prior to being paused;

determining a word in the second contextual portion corresponding to an end of the portion; and storing a position within the textual work, the position corresponding to the word.

27. The computer-implemented method of claim 18, wherein determining the first audio data further comprises:

selecting, based at least in part on features of a linguistic representation of the second portion, a plurality of pre-stored audio waveforms in a database; and
concatenating the plurality of pre-stored audio waveforms together to form the first audio data.

28. The computer-implemented method of claim 18, wherein determining the first audio data further comprises:
synthesizing an acoustic waveform based at least in part on features of a linguistic representation of the second portion.

* * * * *